(12) United States Patent
Iwamoto et al.

(10) Patent No.: US 8,244,739 B2
(45) Date of Patent: Aug. 14, 2012

(54) DATA RETRIEVAL DEVICE USING A SKIP TABLE

(75) Inventors: Kota Iwamoto, Tokyo (JP); Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/995,144

(22) PCT Filed: Jan. 14, 2010

(86) PCT No.: PCT/JP2010/000155
§ 371 (c)(1),
(2), (4) Date: Nov. 29, 2010

(87) PCT Pub. No.: WO2010/084712
PCT Pub. Date: Jul. 29, 2010

(65) Prior Publication Data
US 2011/0099177 A1    Apr. 28, 2011

(30) Foreign Application Priority Data
Jan. 23, 2009  (JP) ................................ 2009-012811

(51) Int. Cl.
*G06F 17/30* (2006.01)
(52) U.S. Cl. ....................................................... 707/749
(58) Field of Classification Search ........................ None
See application file for complete search history.

(56) References Cited

U.S. PATENT DOCUMENTS

| | | | | |
|---|---|---|---|---|
| 3,847,100 A | * | 11/1974 | Garron | 112/450 |
| 4,490,811 A | * | 12/1984 | Yianilos et al. | 1/1 |
| 4,823,306 A | * | 4/1989 | Barbic et al. | 1/1 |
| 5,008,818 A | * | 4/1991 | Bocast | 714/2 |
| 5,014,327 A | * | 5/1991 | Potter et al. | 382/220 |
| 5,189,709 A | * | 2/1993 | Wang et al. | 382/215 |
| 5,192,970 A | * | 3/1993 | Findeis et al. | 355/41 |
| 5,206,845 A | * | 4/1993 | Baxter et al. | 369/30.34 |

(Continued)

FOREIGN PATENT DOCUMENTS

JP  2005-062555 A  3/2005

(Continued)

OTHER PUBLICATIONS

Yoshihiro Ohmori, "A Speeding Up Technique on Time Series Active Search Method by Using Correlative Restriction between Multiple Search Windows," IEICE Technical Report, Mar. 21, 2006, pp. 15-20, vol. 105. No. 689.

(Continued)

*Primary Examiner* — Farhan Syed
(74) *Attorney, Agent, or Firm* — Sughrue Mion, PLLC

(57) ABSTRACT

The data retrieval device includes a first skip correspondence table which corresponds to each piece of data in a retrieval target data series, and, for each possible similarity range which is taken by a similarity between corresponding data and retrieval data, records skip destination data information for specifying the data which appears first after the corresponding data among pieces of data in which similarities with the retrieval data have the possibility to have a predetermined relationship in comparison with a predetermined threshold. The data retrieval device also includes a control unit which, when retrieving data in which a similarity with the retrieval data is smaller than or equal to the threshold from among the retrieval target data series, selects data in the retrieval target data series for which calculation of a similarity with the retrieval data is necessary, using the first skip correspondence table.

39 Claims, 17 Drawing Sheets

GENERATION TABLE FOR FIRST SKIP CORRESPONDENCE TABLE OF $y_j$ (THRESHOLD th = 50)

| SUBSEQUENT DATA | $d(y_j, y_{j+n})$ | MIN. VALUE OF SIMILARITY WITH RETRIEVAL DATA x | SKIP POSSIBLE CONDITION TO $D(x, y_j)$ | CONTINUOUS SKIP POSSIBLE CONDITION |
|---|---|---|---|---|
| $y_{j+1}$ | 10 | $D(x,y_j)-10$ | $D(x,y_j) > 60$ | $D(x,y_j) > 60$ |
| $y_{j+2}$ | 14 | $D(x,y_j)-14$ | $D(x,y_j) > 64$ | $D(x,y_j) > 64$ |
| $y_{j+3}$ | 12 | $D(x,y_j)-12$ | $D(x,y_j) > 62$ | $D(x,y_j) > 64$ |
| $y_{j+4}$ | 13 | $D(x,y_j)-13$ | $D(x,y_j) > 63$ | $D(x,y_j) > 64$ |
| $y_{j+5}$ | 17 | $D(x,y_j)-17$ | $D(x,y_j) > 67$ | $D(x,y_j) > 67$ |
| $y_{j+6}$ | 20 | $D(x,y_j)-20$ | $D(x,y_j) > 70$ | $D(x,y_j) > 70$ |
| $y_{j+7}$ | 23 | $D(x,y_j)-23$ | $D(x,y_j) > 73$ | $D(x,y_j) > 73$ |
| $y_{j+8}$ | 25 | $D(x,y_j)-25$ | $D(x,y_j) > 75$ | $D(x,y_j) > 75$ |
| $y_{j+9}$ | 25 | $D(x,y_j)-25$ | $D(x,y_j) > 75$ | $D(x,y_j) > 75$ |
| $y_{j+10}$ | 27 | $D(x,y_j)-27$ | $D(x,y_j) > 77$ | $D(x,y_j) > 77$ |
| $y_{j+11}$ | 24 | $D(x,y_j)-24$ | $D(x,y_j) > 74$ | $D(x,y_j) > 77$ |
| $y_{j+12}$ | 30 | $D(x,y_j)-30$ | $D(x,y_j) > 80$ | $D(x,y_j) > 80$ |
| $y_{j+13}$ | 34 | $D(x,y_j)-34$ | $D(x,y_j) > 84$ | $D(x,y_j) > 84$ |

U.S. PATENT DOCUMENTS

| | | | |
|---|---|---|---|
| 5,251,316 A * | 10/1993 | Anick et al. | 1/1 |
| 5,261,100 A * | 11/1993 | Fujinami et al. | 717/122 |
| 5,265,242 A * | 11/1993 | Fujisawa et al. | 1/1 |
| 5,278,980 A * | 1/1994 | Pedersen et al. | 1/1 |
| 5,301,109 A * | 4/1994 | Landauer et al. | 704/9 |
| 5,321,833 A * | 6/1994 | Chang et al. | 1/1 |
| 5,331,554 A * | 7/1994 | Graham | 1/1 |
| 5,355,466 A * | 10/1994 | Iwamoto | 710/108 |
| 5,546,572 A * | 8/1996 | Seto et al. | 1/1 |
| 5,652,881 A * | 7/1997 | Takahashi et al. | 382/162 |
| 5,684,999 A * | 11/1997 | Okamoto | 704/9 |
| 5,694,594 A * | 12/1997 | Chang | 1/1 |
| 5,717,835 A * | 2/1998 | Hellerstein | 706/46 |
| 5,748,886 A * | 5/1998 | Hijii | 714/49 |
| 5,845,261 A * | 12/1998 | McAbian | 705/14.4 |
| 5,848,217 A * | 12/1998 | Tsukagoshi et al. | 386/239 |
| 5,893,095 A * | 4/1999 | Jain et al. | 1/1 |
| 5,911,139 A * | 6/1999 | Jain et al. | 1/1 |
| 5,913,205 A * | 6/1999 | Jain et al. | 1/1 |
| 5,915,250 A * | 6/1999 | Jain et al. | 1/1 |
| 5,930,783 A * | 7/1999 | Li et al. | 1/1 |
| 5,991,714 A * | 11/1999 | Shaner | 704/9 |
| 6,175,828 B1 * | 1/2001 | Kuromusha et al. | 1/1 |
| 6,424,688 B1 * | 7/2002 | Tan et al. | 375/354 |
| 6,442,538 B1 | 8/2002 | Nojima | |
| 6,774,917 B1 | 8/2004 | Foote et al. | |
| 6,906,823 B1 * | 6/2005 | Jackson et al. | 358/1.16 |
| 7,035,775 B2 * | 4/2006 | Abe et al. | 702/189 |
| 7,046,733 B2 * | 5/2006 | Bushmitch et al. | 375/240.26 |
| 7,257,206 B2 * | 8/2007 | Janveja et al. | 379/114.03 |
| 7,283,999 B1 * | 10/2007 | Ramesh et al. | 1/1 |
| 7,596,639 B2 * | 9/2009 | Ellis et al. | 710/22 |
| 7,747,769 B1 * | 6/2010 | Kearns et al. | 709/231 |
| 7,920,164 B2 * | 4/2011 | Kasutani et al. | 348/143 |
| 2002/0019929 A1 * | 2/2002 | Kurata | 712/226 |
| 2003/0192002 A1 * | 10/2003 | Sweeney et al. | 714/755 |
| 2003/0231750 A1 * | 12/2003 | Janveja et al. | 379/114.03 |
| 2004/0023643 A1 * | 2/2004 | Vander Veen et al. | 455/413 |
| 2004/0098225 A1 * | 5/2004 | Abe et al. | 702/181 |
| 2005/0226598 A1 * | 10/2005 | Kasutani et al. | 386/55 |
| 2006/0031600 A1 * | 2/2006 | Ellis et al. | 710/22 |
| 2006/0047865 A1 * | 3/2006 | Ellis et al. | 710/22 |
| 2007/0088727 A1 * | 4/2007 | Kindig | 707/101 |
| 2007/0089057 A1 * | 4/2007 | Kindig | 715/716 |
| 2008/0091650 A1 * | 4/2008 | Fontoura et al. | 707/3 |
| 2009/0234878 A1 * | 9/2009 | Herz et al. | 707/102 |
| 2010/0278268 A1 * | 11/2010 | Lee et al. | 375/240.16 |
| 2011/0099177 A1 * | 4/2011 | Iwamoto et al. | 707/749 |

FOREIGN PATENT DOCUMENTS

| | | |
|---|---|---|
| JP | 2007-157064 A | 6/2007 |
| JP | 2007-306322 A | 11/2007 |

OTHER PUBLICATIONS

Syougo Kimura, "Global na Edagari wo Douryushita Oto ya Eiozuno Kousokukensaku," Image Lab, Nov. 2003, vol. 14, No. 11, pp. 60-67.

Masahide Sugiyama, "An Efficient Similar Segment Search Algorithm in Multiple Time Series," IPSJ Journal, Jan. 2008, pp. 487-496, vol. 49, No. 1.

Extended European Search Report issued on Jul. 5, 2011 in the corresponding European Patent Application No. 10733320.5.

\* cited by examiner

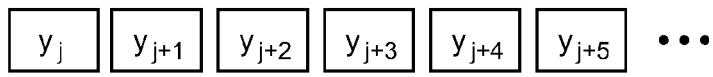

(b)

GENERATION TABLE FOR FIRST SKIP
CORRESPONDENCE TABLE OF $y_j$

| SUBSEQUENT DATA | SIMILARITY | MIN. VALUE | SKIP POSSIBLE CONDITION | CONTINUOUS SKIP POSSIBLE CONDITION |
|---|---|---|---|---|
| $y_{j+1}$ | $d(y_j, y_{j+1})$ | $D(x,y_j) - d(y_j, y_{j+1})$ | $D(x,y_j) > th + d(y_j, y_{j+1})$ | |
| $y_{j+2}$ | $d(y_j, y_{j+2})$ | $D(x,y_j) - d(y_j, y_{j+2})$ | $D(x,y_j) > th + d(y_j, y_{j+2})$ | |
| $y_{j+3}$ | $d(y_j, y_{j+3})$ | $D(x,y_j) - d(y_j, y_{j+3})$ | $D(x,y_j) > th + d(y_j, y_{j+3})$ | |
| $y_{j+4}$ | $d(y_j, y_{j+4})$ | $D(x,y_j) - d(y_j, y_{j+4})$ | $D(x,y_j) > th + d(y_j, y_{j+4})$ | |
| $y_{j+5}$ | $d(y_j, y_{j+5})$ | $D(x,y_j) - d(y_j, y_{j+5})$ | $D(x,y_j) > th + d(y_j, y_{j+5})$ | |
| ⋮ | ⋮ | ⋮ | ⋮ | |

FIG. 4

GENERATION TABLE FOR FIRST SKIP CORRESPONDENCE TABLE OF $y_j$ (THRESHOLD th = 50)

| SUBSEQUENT DATA | $d(y_j, y_{j+n})$ | MIN. VALUE OF SIMILARITY WITH RETRIEVAL DATA x | SKIP POSSIBLE CONDITION TO $D(x, y_j)$ | CONTINUOUS SKIP POSSIBLE CONDITION |
|---|---|---|---|---|
| $y_{j+1}$ | 10 | $D(x,y_j) - 10$ | $D(x,y_j) > 60$ | $D(x,y_j) > 60$ |
| $y_{j+2}$ | 14 | $D(x,y_j) - 14$ | $D(x,y_j) > 64$ | $D(x,y_j) > 64$ |
| $y_{j+3}$ | 12 | $D(x,y_j) - 12$ | $D(x,y_j) > 62$ | $D(x,y_j) > 64$ |
| $y_{j+4}$ | 13 | $D(x,y_j) - 13$ | $D(x,y_j) > 63$ | $D(x,y_j) > 64$ |
| $y_{j+5}$ | 17 | $D(x,y_j) - 17$ | $D(x,y_j) > 67$ | $D(x,y_j) > 67$ |
| $y_{j+6}$ | 20 | $D(x,y_j) - 20$ | $D(x,y_j) > 70$ | $D(x,y_j) > 70$ |
| $y_{j+7}$ | 23 | $D(x,y_j) - 23$ | $D(x,y_j) > 73$ | $D(x,y_j) > 73$ |
| $y_{j+8}$ | 25 | $D(x,y_j) - 25$ | $D(x,y_j) > 75$ | $D(x,y_j) > 75$ |
| $y_{j+9}$ | 25 | $D(x,y_j) - 25$ | $D(x,y_j) > 75$ | $D(x,y_j) > 75$ |
| $y_{j+10}$ | 27 | $D(x,y_j) - 27$ | $D(x,y_j) > 77$ | $D(x,y_j) > 77$ |
| $y_{j+11}$ | 24 | $D(x,y_j) - 24$ | $D(x,y_j) > 74$ | $D(x,y_j) > 77$ |
| $y_{j+12}$ | 30 | $D(x,y_j) - 30$ | $D(x,y_j) > 80$ | $D(x,y_j) > 80$ |
| $y_{j+13}$ | 34 | $D(x,y_j) - 34$ | $D(x,y_j) > 84$ | $D(x,y_j) > 84$ |

FIG. 5

FIRST SKIP CORRESPONDENCE TABLE OF $y_j$

| $D(x, y_j)$ | SKIP DESTINATION DATA |
|---|---|
| $60 < D(x, y_j) \leq 64$ | j+2 |
| $64 < D(x, y_j) \leq 67$ | j+5 |
| $67 < D(x, y_j) \leq 70$ | j+6 |
| $70 < D(x, y_j) \leq 73$ | j+7 |
| $73 < D(x, y_j) \leq 75$ | j+8 |
| $75 < D(x, y_j) \leq 77$ | j+10 |
| $77 < D(x, y_j) \leq 80$ | j+12 |
| $80 < D(x, y_j) \leq 84$ | j+13 |
| $84 < D(x, y_j)$ | j+14 |

FIG. 6

FIRST SKIP CORRESPONDENCE TABLE OF $y_j$

| $D(x, y_j)$ | SKIP DESTINATION DATA |
|---|---|
| $60 < D(x, y_j) \leqq 64$ | j+2 |
| $64 < D(x, y_j) \leqq 67$ | j+5 |
| $67 < D(x, y_j) \leqq 70$ | j+6 |
| $70 < D(x, y_j) \leqq 73$ | j+7 |
| $73 < D(x, y_j) \leqq 77$ | j+8 |
| $77 < D(x, y_j) \leqq 84$ | j+12 |
| $84 < D(x, y_j)$ | j+14 |

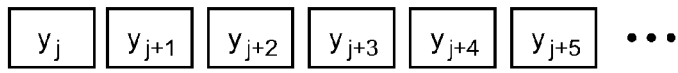

(b)

GENERATION TABLE FOR SECOND SKIP
CORRESPONDENCE TABLE OF $y_j$

| SUBSEQUENT DATA | SIMILARITY | MAX. VALUE | SKIP POSSIBLE CONDITION | CONTINUOUS SKIP POSSIBLE CONDITION |
|---|---|---|---|---|
| $y_{j+1}$ | $d(y_j, y_{j+1})$ | $D(x,y_j)+d(y_j,y_{j+1})$ | $D(x,y_j) \leq th-d(y_j,y_{j+1})$ | |
| $y_{j+2}$ | $d(y_j, y_{j+2})$ | $D(x,y_j)+d(y_j,y_{j+2})$ | $D(x,y_j) \leq th-d(y_j,y_{j+2})$ | |
| $y_{j+3}$ | $d(y_j, y_{j+3})$ | $D(x,y_j)+d(y_j,y_{j+3})$ | $D(x,y_j) \leq th-d(y_j,y_{j+3})$ | |
| $y_{j+4}$ | $d(y_j, y_{j+4})$ | $D(x,y_j)+d(y_j,y_{j+4})$ | $D(x,y_j) \leq th-d(y_j,y_{j+4})$ | |
| $y_{j+5}$ | $d(y_j, y_{j+5})$ | $D(x,y_j)+d(y_j,y_{j+5})$ | $D(x,y_j) \leq th-d(y_j,y_{j+5})$ | |
| ⋮ | ⋮ | ⋮ | ⋮ | |

FIG. 11

GENERATION TABLE FOR SECOND SKIP CORRESPONDENCE TABLE OF $y_j$ (THRESHOLD th = 50)

| SUBSEQUENT DATA | $d(y_j, y_{j+n})$ | MAX. VALUE OF SIMILARITY WITH RETRIEVAL DATA x | SKIP POSSIBLE CONDITION TO $D(x, y_j)$ | CONTINUOUS SKIP POSSIBLE CONDITION |
|---|---|---|---|---|
| $y_{j+1}$ | 10 | $D(x,y_j)+10$ | $D(x,y_j) \leq 40$ | $D(x,y_j) \leq 40$ |
| $y_{j+2}$ | 14 | $D(x,y_j)+14$ | $D(x,y_j) \leq 36$ | $D(x,y_j) \leq 36$ |
| $y_{j+3}$ | 12 | $D(x,y_j)+12$ | $D(x,y_j) \leq 38$ | $D(x,y_j) \leq 36$ |
| $y_{j+4}$ | 13 | $D(x,y_j)+13$ | $D(x,y_j) \leq 37$ | $D(x,y_j) \leq 36$ |
| $y_{j+5}$ | 17 | $D(x,y_j)+17$ | $D(x,y_j) \leq 33$ | $D(x,y_j) \leq 33$ |
| $y_{j+6}$ | 20 | $D(x,y_j)+20$ | $D(x,y_j) \leq 30$ | $D(x,y_j) \leq 30$ |
| $y_{j+7}$ | 23 | $D(x,y_j)+23$ | $D(x,y_j) \leq 27$ | $D(x,y_j) \leq 27$ |
| $y_{j+8}$ | 25 | $D(x,y_j)+25$ | $D(x,y_j) \leq 25$ | $D(x,y_j) \leq 25$ |
| $y_{j+9}$ | 25 | $D(x,y_j)+25$ | $D(x,y_j) \leq 25$ | $D(x,y_j) \leq 25$ |
| $y_{j+10}$ | 27 | $D(x,y_j)+27$ | $D(x,y_j) \leq 23$ | $D(x,y_j) \leq 23$ |
| $y_{j+11}$ | 24 | $D(x,y_j)+24$ | $D(x,y_j) \leq 26$ | $D(x,y_j) \leq 23$ |
| $y_{j+12}$ | 30 | $D(x,y_j)+30$ | $D(x,y_j) \leq 20$ | $D(x,y_j) \leq 20$ |
| $y_{j+13}$ | 34 | $D(x,y_j)+34$ | $D(x,y_j) \leq 16$ | $D(x,y_j) \leq 16$ |

FIG. 12

SECOND SKIP CORRESPONDENCE TABLE OF $y_j$

| $D(x, y_j)$ | SKIP DESTINATION DATA |
|---|---|
| $36 < D(x, y_j) \leqq 40$ | j+2 |
| $33 < D(x, y_j) \leqq 36$ | j+5 |
| $30 < D(x, y_j) \leqq 33$ | j+6 |
| $27 < D(x, y_j) \leqq 30$ | j+7 |
| $25 < D(x, y_j) \leqq 27$ | j+8 |
| $23 < D(x, y_j) \leqq 25$ | j+10 |
| $20 < D(x, y_j) \leqq 23$ | j+12 |
| $16 < D(x, y_j) \leqq 20$ | j+13 |

FIG. 13

SECOND SKIP CORRESPONDENCE TABLE OF $y_j$

| $D(x,y_j)$ | SKIP DESTINATION DATA |
|---|---|
| $36 < D(x,y_j) \leqq 40$ | j+2 |
| $33 < D(x,y_j) \leqq 36$ | j+5 |
| $30 < D(x,y_j) \leqq 33$ | j+6 |
| $27 < D(x,y_j) \leqq 30$ | j+7 |
| $23 < D(x,y_j) \leqq 27$ | j+8 |
| $16 < D(x,y_j) \leqq 23$ | j+12 |

SELF SIMILARITY TABLE OF $y_j$ (b)

| SUBSEQUENT DATA | SIMILARITY |
|---|---|
| $y_{j+1}$ | $d(y_j, y_{j+1})$ |
| $y_{j+2}$ | $d(y_j, y_{j+2})$ |
| $y_{j+3}$ | $d(y_j, y_{j+3})$ |
| $y_{j+4}$ | $d(y_j, y_{j+4})$ |
| $y_{j+5}$ | $d(y_j, y_{j+5})$ |
| ⋮ | ⋮ |

DATA RETRIEVAL DEVICE USING A SKIP TABLE

TECHNICAL FIELD

The present invention relates to data retrieval devices, and in particular, to data retrieval devices for retrieving data similar to retrieval data from among a retrieval target data series.

BACKGROUND ART

A typical method of retrieving data similar to retrieval data from among a retrieval target data series, including video data and audio data stored in a storage device, includes calculating similarities between the retrieval data and all pieces of data in the retrieval target data series, and comparing them with a threshold. However, as the amount of calculation for similarities between pieces of data is generally large, the above method in which similarities between the retrieval data and all pieces of data in the retrieval target data series must be calculated needs a long time for retrieval. As such, some methods for speeding up this type of retrieval have been proposed.

For example, Patent Document 1 describes, in the background art section, a method of performing retrieval at a high speed in such a manner that similarity calculation is terminated if a similarity exceeds a certain threshold. Patent Document 1 also proposes a method of calculating similarities between a part of data series and another one of or a plurality of parts as a self similarity table, and using the table to perform retrieval at a high speed.

PRIOR ART DOCUMENT

Patent Document
Patent Document 1: Japanese Unexamined Patent Publication No. 2005-62555

SUMMARY OF THE INVENTION

Problems to be Solved by the Invention

As shown in FIG. 17(a), a retrieval target data series is assumed to be a data series composed of $y_j$, $y_{j+1}$, $y_{j+2}$, $y_{j+3}$, $y_{j+4}$, $y_{j+5}$, and the like. In that case, as shown in FIG. 17(b), a self similarity table of the leading data $y_j$ is a table containing a similarity $d(y_j, y_{j+1})$ between the data $y_j$ and data $y_{j+1}$, a similarity $d(y_j, y_{j+2})$ between the data $y_j$ and data $y_{j+2}$, a similarity $d(y_j, y_{j+3})$ between the data $y_j$ and data $y_{j+3}$, a similarity $d(y_j, y_{j+4})$ between the data $y_j$ and data $y_{j+4}$, a similarity $d(y_j, y_{j+5})$ between the data $y_j$ and data $y_{j+5}$, and the like. It is assumed that the value of a similarity takes a positive value of 0 or larger, and that as the value is smaller, similarity is higher.

In the case of retrieving data, in which a similarity with retrieval data $x_i$ is smaller than or equal to a threshold th, from among a retrieval target data series, retrieval using a self similarity table is performed in the following procedures.

First, a similarity between the retrieval data $x_i$ and the data $y_j$ is calculated. Assuming that the obtained similarity is $D(x_i, y_j)$, it is determined whether the data $y_j$ is similar data or dissimilar data of the retrieval data $x_i$ with use of the following Expression 1. As such, if the similarity $D(x_i, y_j)$ is smaller than or equal to a threshold th, the data $y_j$ is output as similar data, while if the similarity is larger than the threshold th, the data $y_j$ is regarded as dissimilar data.

$$D(x_i, y_j) \leq th \quad \text{[Expression 1]}$$

If the data $y_j$ is regarded as dissimilar data, the next data, on which similarity calculation with the retrieval data $x_i$ is performed, is determined in the following manner. First, a similarity $d(y_j, y_{j+1})$ between the data $y_j$ and the immediately following data $y_{j+1}$ is obtained from the self similarity table of the data $y_j$, and is subtracted from the similarity $D(x_i, y_j)$. Then, the subtracted result $[D(x_i, y_j)-d(y_j, y_{j+1})]$ is compared with the threshold th, and if $[D(x_i, y_j)-d(y_j, y_{j+1}) \leq th]$, the data $y_{j+1}$ is determined to be data on which similarity calculation with the retrieval data $x_i$ is performed next. On the other hand, if $[D(x_i, y_j)-d(y_j, y_{j+1}) > th]$, the data $y_{j+1}$ is eliminated from the target of similarity calculation, because even if a similarity between the data $y_{j+1}$ and the retrieval data $x_i$ is calculated, it is logically impossible that the calculation result becomes smaller than or equal to the threshold th. If the data $y_{j+1}$ is eliminated from the target of similarity calculation, determination which is the same as that performed on the data $y_{j+1}$ is repeatedly performed in sequence on the subsequent pieces of data, whereby data to be used for similarity calculation with the retrieval data $x_i$ is determined.

By using the self similarity table as described above, it is possible to reduce the number of data for which a similarity with the retrieval data $x_i$ should be calculated, whereby retrieval can be performed at a higher speed.

However, it is necessary to perform subtraction of similarities and a process of threshold determination in sequence for the respective pieces of data subsequent to the data $y_j$ until data to be used for similarity calculation is determined, which poses an impediment for further speed-up.

An object of the present invention is to provide a data retrieval device capable of retrieving data in which a similarity with retrieval data is smaller than or equal to a predetermined threshold at a high speed, from among a retrieval target data series.

Means for Solving the Problems

According to an aspect of the present invention, a data retrieval device includes a first skip correspondence table which corresponds to each piece of data in a retrieval target data series, and, for each possible similarity range which is taken by a similarity between corresponding data and retrieval data, records skip destination data information for specifying the data which appears first after the corresponding data among pieces of data in which similarities with the retrieval data have the possibility to have a predetermined relationship in comparison with a predetermined threshold; and a control unit which, when retrieving data in which a similarity with the retrieval data is smaller than or equal to the threshold from among the retrieval target data series, selects data in the retrieval target data series for which calculation of a similarity with the retrieval data is necessary, using the first skip correspondence table.

Effects of the Invention

According to the present invention, data in which a similarity with retrieval data is smaller than or equal to a predetermined threshold can be retrieved at a high speed, from among a retrieval target data series.

BRIEF DESCRIPTION OF THE DRAWINGS

FIG. 3 shows an example of a retrieval target data series, and an exemplary configuration of an internal table to be used by the first skip correspondence table generation section according to the first embodiment of the present invention.

FIG. 4 shows a specific example of an internal table to be used by the first skip correspondence table generation section according to the first embodiment of the present invention.

FIG. 5 shows a specific example of the first skip correspondence table according to the first embodiment of the present invention.

FIG. 6 shows another specific example of the first skip correspondence table according to the first embodiment of the present invention.

FIG. 10 shows an example of a retrieval target data series, and an exemplary configuration of an internal table to be used by the second skip correspondence table generation section according to the second embodiment of the present invention.

FIG. 11 shows a specific example of an internal table to be used by the second skip correspondence table generation section according to the second embodiment of the present invention.

FIG. 12 shows a specific example of the second skip correspondence table according to the second embodiment of the present invention.

FIG. 13 shows another specific example of the second skip correspondence table according to the second embodiment of the present invention.

FIG. 17 shows an example of a self similarity table.

DESCRIPTION OF EMBODIMENTS

First Embodiment

Figure 1:
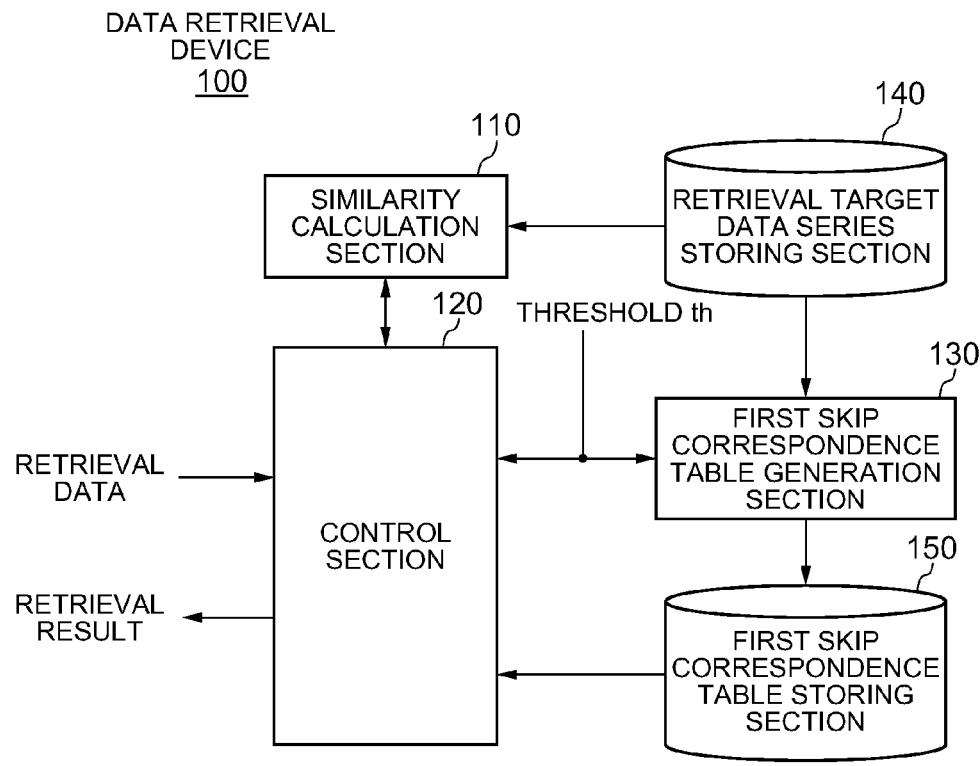
FIG. 1 is a block diagram of a first embodiment of the present invention.

Referring to FIG. 1, a data retrieval device according to a first embodiment of the present invention includes a similarity calculation section 110, a control section 120, a first skip correspondence table generation section 130, a retrieval target data series storing section 140, and a first skip correspondence table storing section 150.

The retrieval target data series storing section 140 stores one or more retrieval target data series. One retrieval target data series is composed of a plurality of data strings. If the data retrieval device 100 is a moving image retrieval device, for example, a retrieval target data series corresponds to a time-series signal in which continuous frame images or feature vectors of frame images of moving images are aligned in time order, and one piece of data corresponds to one frame image or a feature vector thereof. The data retrieval device of the present invention is not only applicable to retrieval of moving images, but also applicable to a variety of types of retrieval such as audio retrieval. However, in the below description, it is assumed that the retrieval target data series is a signal in which feature vectors of continuous frame images of moving images are aligned in time order, for the sake of convenience.

The first skip correspondence table generation section 130 is a means for generating a first skip correspondence table of each piece of data in the retrieval target data series stored in the retrieval target data series storing section 140. It should be noted that a first skip correspondence table of a piece of data means a table containing, for each of the ranges that similarities between such data and the retrieval data may take, information for specifying the data which appears first after such data, among data in which similarities with the retrieval data may be present in a range up to a predetermined threshold th or smaller.

The first skip correspondence table storing section 150 is a means for storing the first skip correspondence table generated by the first skip correspondence table generation section 130. The first skip correspondence table is stored in the first skip correspondence table storing section 150 in association with data in the retrieval target data series, in such a manner that the data corresponding to the table is clearly distinguishable.

The similarity calculation section 110 is a means for calculating a similarity between the retrieval data and data in the retrieval target data series. The retrieval data may also be a piece of data in data strings composed of a plurality of strings of data. In the present embodiment, each piece of data in the retrieval target data series is a feature vector, and the retrieval data is also a feature vector. The similarity calculation section 110 calculates a distance (e.g., Hamming distance, Euclidean distance, or square of Euclidean distance) between the vectors as a similarity. In this case, as the value of a similarity is closer to 0, the vectors are more similar. In the present invention, any arbitrary scale of similarity may be used, and so it is of course possible to calculate a similarity by means of a calculation method other than those described above.

The control section 120 is a means for controlling the entire data retrieval device 100. When retrieval data is input from the outside of the data retrieval device 100, the control section 120 controls the similarity calculation section 110 to calculate a similarity between the retrieval data and data in the retrieval target data series, compares the calculation result with a predetermined threshold th, to thereby determine whether or not such data is data similar to the retrieval data. If the data is similar to the retrieval data, the control section 120 outputs the data as a retrieval result, and repeats the same processing for the next data. In contrast, if the data is not similar to the retrieval data, the control section 120 determines, according to the similarity between the data and the retrieval data and the first skip correspondence table of the data, data in the retrieval target data series for which a similarity with the retrieval data is calculated next, and repeats the same processing to the determined data.

Next, operation of the data retrieval device 100 according to the present embodiment will be described.

Operation of the data retrieval device 100 is roughly classified into first skip correspondence table generating operation which is performed prior to execution of the actual data retrieval operation, and data retrieval operation using the generated first skip correspondence table.

(1) First Skip Correspondence Table Generating Operation

Figure 2:
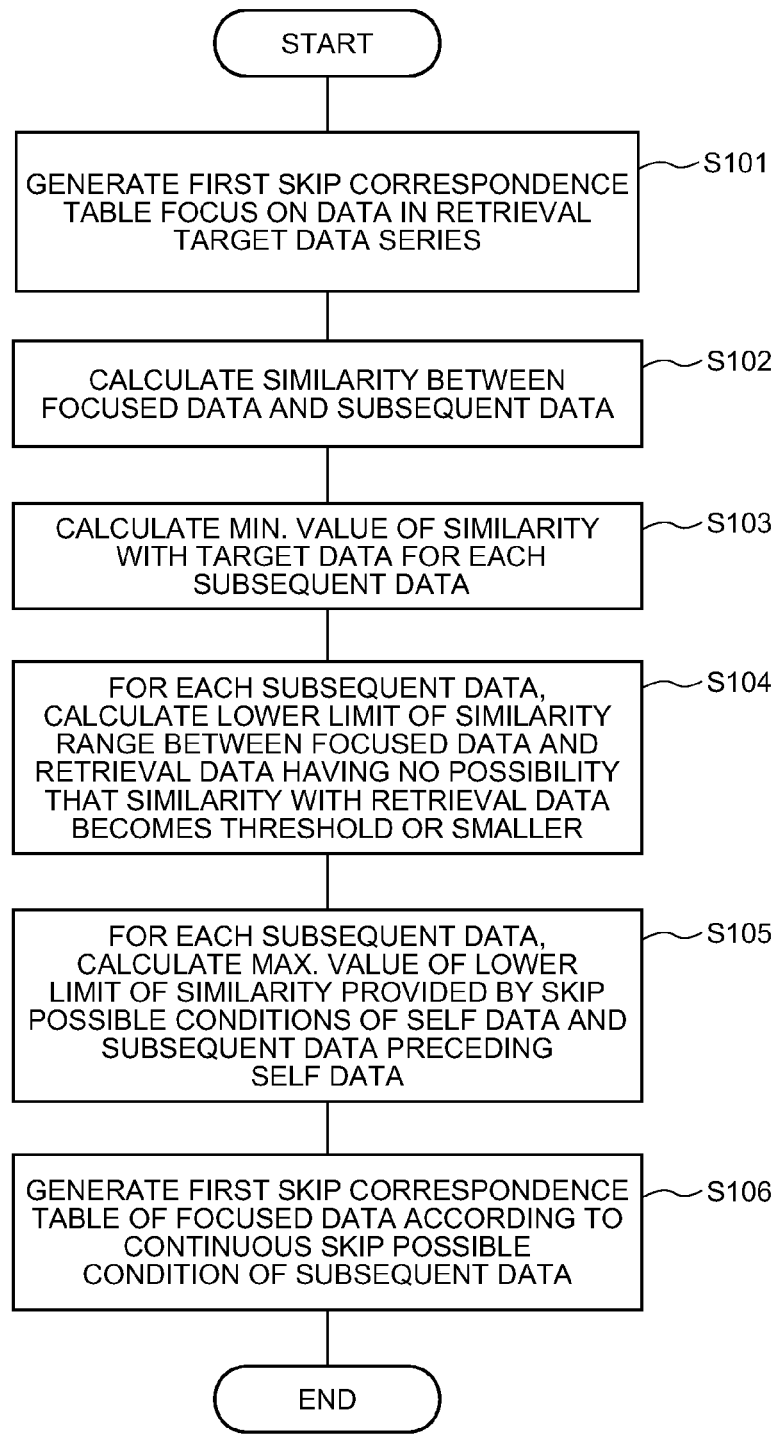
FIG. 2 is a flowchart showing an exemplary process performed by a first skip correspondence table generation section according to the first embodiment of the present invention.

The first skip correspondence table generation section 130 generates, for each data in the retrieval target data series stored in the retrieval target data series storing section 140, a first skip correspondence table of the data, in line with the flow shown in the flowchart of FIG. 2.

First, the first skip correspondence table generation section 130 focuses on a piece of data in the retrieval target data series, for generating a first skip correspondence table (step S101). In this description, it is assumed that the retrieval target data series is a series of data (in this example, n-dimensional feature vectors) composed of $y_j$, $y_{j+1}$, $y_{j+2}$, $y_{j+3}$, $y_{j+4}$, $y_{j+5}$, and the like, as shown in FIG. 3(a), and that the leading data $y_j$ is focused, for the sake of convenience.

Next, the first skip correspondence table generation section 130 calculates similarities $d(y_j, y_{j+1})$, $d(y_j, y_{j+2})$, ... $d(y_j, y_{j+m})$ between the focused data $y_j$ and subsequent m pieces of data $y_{j+1}$, $y_{j+2}$, ... $y_{j+m}$, and stores the calculation results in an internal table (step S102). The number m of the subsequent data for calculating similarities is arbitrary. If the number m of the subsequent data is larger, although there is a possibility of reducing a larger number of data on which similarity calculation with the retrieval data is performed, the storage capacity required for skip correspondence tables is increased. As such, the value of m is determined in advance while considering both.

FIG. 3(b) shows an exemplary internal table to be used in the process of generating the first skip correspondence table by the first skip correspondence table generation section 130. The internal table is composed of m number of entries at maximum, and each of the entries is composed of five items including subsequent data, similarity, minimum value, skip possible condition, and continuous skip possible condition. At step S102, the first skip correspondence table generation section 130 sets $y_{j+1}$, $y_{j+2}$, ... $y_{j+m}$ to the item of subsequent data, and sets similarities $d(y_j, y_{i+1})$, $d(y_j, y_{i+2})$, ... $d(y_j, y_{j+m})$ with the data $y_j$ to the item of similarity, in the respective entries of the internal table.

Next, for each of the subsequent data $y_{j+1}$, $y_{j+2}$, ... $y_{j+m}$, the first skip correspondence table generation section 130 calculates a minimum value of the similarity with the retrieval data using the similarity $D(x, y_j)$ between the retrieval data and the data $y_j$, and also the similarity between the data $y_j$ and the subsequent data, and sets the value to the item of minimum value in the internal table (step S103). For example, in the case of subsequent data $y_{j+1}$, as the similarity with the data $y_j$ is $d(y_j, y_{j+1})$ and the similarity with the retrieval data is $D(x, y_j)$, a minimum value of the similarity between the retrieval data and the subsequent data $y_{j+1}$ is $[D(x, y_j)-d(y_j, y_{j+1})]$.

Next, for each of the subsequent data $y_{j+1}$, $y_{j+2}$, ... $y_{j+m}$, the first skip correspondence table generation section 130 calculates, with use of the minimum value of the similarity with the retrieval data and a threshold th provided separately, a lower limit of the similarity range between the data $y_j$ and the retrieval data having no possibility that the similarity with the retrieval data becomes smaller than or equal to a threshold (having no possibility of being similar to the retrieval data), and sets the value to the item of skip possible condition of the internal table (step S104). For example, in the case of the subsequent data $y_{j+1}$, as there is no possibility that the data is similar to the retrieval data if even the minimum value $[D(x, y_j)-d(y_j, y_{j+1})]$ is larger than the threshold th, according to Expression 1, $[D(x, y_j)>th+d(y_j, y_{j+1})]$ is set to be a skip possible condition.

Next, for each of the subsequent data $y_{j+1}$, $y_{j+2}$, ... $y_{j+m}$, the first skip correspondence table generation section 130 calculates a maximum value of the lower limit of the similarity given by the skip possible conditions of the self data and other subsequent data preceding the self data, and sets the value to the item of continuous skip possible condition of the internal table (step S105).

Next, according to the continuous skip possible conditions of the subsequent data $y_{j+1}$, $y_{j+2}$, ... $y_{j+m}$, the first skip correspondence table generation section 130 generates the first skip correspondence table of the focused data $y_j$, and stores the table in the first skip correspondence table storing section 150 (step S106). Specifically, from among the lower limits of the similarities given by the continuous skip possible conditions of the subsequent data $y_{j+1}$, $y_{j+2}$, ... $y_{j+m}$, the first skip correspondence table generation section 130 generates a first similarity range in which a lower limit having the smallest value is set to be a lower limit value and a lower limit having the second smallest value is set to be un upper limit value, and as skip destination data for the case where the similarity between the focused data $y_j$ and the retrieval data satisfies the first similarity range, sets the last data among the subsequent data having the continuous skip possible conditions equivalent to the upper limit value of the first similarity range. Next, from among the lower limits of the similarities given by the continuous skip possible conditions of the subsequent data $y_{j+1}$, $y_{j+2}$, ... $y_{j+m}$, the first skip correspondence table generation section 130 generates a second similarity range in which a lower limit having the second smallest value is set to be a lower limit value and a lower limit having the third smallest value is set to be un upper limit value, and as skip destination data for the case where the similarity between the focused data $y_j$ and the retrieval data satisfies the second similarity range, sets the last data among the subsequent data having the continuous skip possible conditions equivalent to the upper limit value of the second similarity range. The first skip correspondence table generation section 130 repeats the same processing until a similarity range in which the maximum value among the lower limits of the similarities given by the continuous skip possible conditions of the subsequent data $yj+1$, $y_{j+2}$, ... $y_{j+m}$ is set to be a lower limit value.

FIG. 4 shows a specific example of the internal table used in the process of generating the first skip correspondence table of the data $y_j$, and FIG. 5 shows a specific example of the first skip correspondence table of the data $y_j$. In this example, the threshold th is 50, and the number m is 13.

In the internal table shown in FIG. 4, the entry of the subsequent data $y_{j+3}$, for example, indicates that the similarity with the data $y_j$ is 12, the minimum value of the similarity with the retrieval data is $[D(x, y_j)-12]$, the skip possible condition is $[D(x, y_j)>62]$, and the continuous skip possible condition is $[D(x, y_j)>64]$. The grounds that the continuous skip possible condition of the subsequent data $y_{j+3}$ is not the skip possible conditions of $[D(x, y_j)>62]$ but $[D(x, y_j)>64]$ is that the skip possible condition of the data $y_{j+2}$, preceding the self data $y_{j+3}$, is $[D(x, y_j)>64]$.

Further, in FIG. 5, the first entry in the first skip correspondence table of the data $y_j$ indicates that if the similarity between the data $y_j$ and the retrieval data is larger than 60 and equal to or smaller than 64, the next data for which a similarity with the retrieval target data is calculated is data $y_{j+2}$. The first entry is data generated from the continuous skip possible conditions of the subsequent data $y_{j+1}$ and $y_{j+2}$ in the internal table shown in FIG. 4.

Further, the second entry in the first skip correspondence table of the data $y_j$ shown in FIG. 5, for example, indicates that if the similarity between the data $y_j$ and the retrieval data is larger than 64 and equal to or smaller than 67, the next data for which a similarity with the retrieval target data is calculated is data $y_{j+5}$. The second entry is data generated from the continuous skip possible conditions of the subsequent data $y_{j+2}$ to $y_{j+5}$ in the internal table shown in FIG. 4.

The first skip correspondence table generation section 130 generates first skip correspondence tables of data other than the data $y_j$ in the retrieval target data series stored in the retrieval target data series storing section 140, in accordance with the same procedure as that for the data $y_j$. However, as there is no subsequent data to the last data in the retrieval target data series, the first skip correspondence table is not generated for the last data. Further, it is also possible not to generate first skip correspondence table of all data except for the last data, but to generate first skip correspondence tables only for the predetermined partial data. Examples of partial data include even number data, odd number data, every p (>2) number data, and the like.

Further, the first skip correspondence table generation section 130 may perform a process of combining a plurality of continuous entries in the first skip correspondence table generated at step S106 in FIG. 2 into one entry to thereby reduce the number of entries in the first skip correspondence table. An entry formed by combining a plurality of continuous entries has a similarity range in which the minimum value of the lower limits of the similarity ranges of the plurality of entries before combination is the lower limit value, and the maximum value of the upper limits of the similarity ranges thereof is the upper limit value, and has skip destination data which is the leading data among the skip destination data of the plurality of entries before combination. For example, in the first skip correspondence table of FIG. 5, if the fifth and sixth entries are combined in one entry and the seventh and eighth entries are combined in one entry, a first skip correspondence table shown in FIG. 6 is generated.

As described above, by combining a plurality of entries in the first skip correspondence table to reduce the number of entries, it is possible to reduce the storage capacity required for the first skip correspondence table at the sacrifice of a maximum range for which skip is possible (skip can actually be performed a little longer).

When combining a plurality of entries in the first skip correspondence table, the following process may be taken.

If the upper limit of the storage capacity which can be allocated to the first skip correspondence table is set, for example, it is possible to repeat reduction of the number of entries by combining the entries until the storage capacity for the first skip correspondence table becomes smaller than the upper limit.

Further, when combining a plurality of entries, it is also possible to select entries to be combined so as to reduce the similarity range to be sacrificed by the entry combination (skip can actually be performed a little longer), for example. Specifically, if the fifth and the sixth entries shown in FIG. 5 are combined into one entry, the similarity range of the sixth entry, that is, [75<D≦77], is sacrificed (skip can actually be performed a little longer). If the seventh and the eighth entries are combined in one entry, the similarity range of the eighth entry, that is, [80<D≦84], is sacrificed (skip can actually be performed a little longer). When comparing these two cases, as the similarity range to be sacrificed is smaller in the former case, it is effective to combine the fifth and the sixth entries. In this case, the number of frames to be sacrificed or the probability to be taken by the similarity may be considered. By reducing the number of entries by combining entries in the first skip correspondence table while considering the possibility of sacrifice as described above, it is possible to maximize the efficiency of speeding up the retrieval operation provided by the first skip correspondence table with respect to the unit storage capacity of the first skip correspondence table.

(2) Data Retrieval Operation

Figure 7:
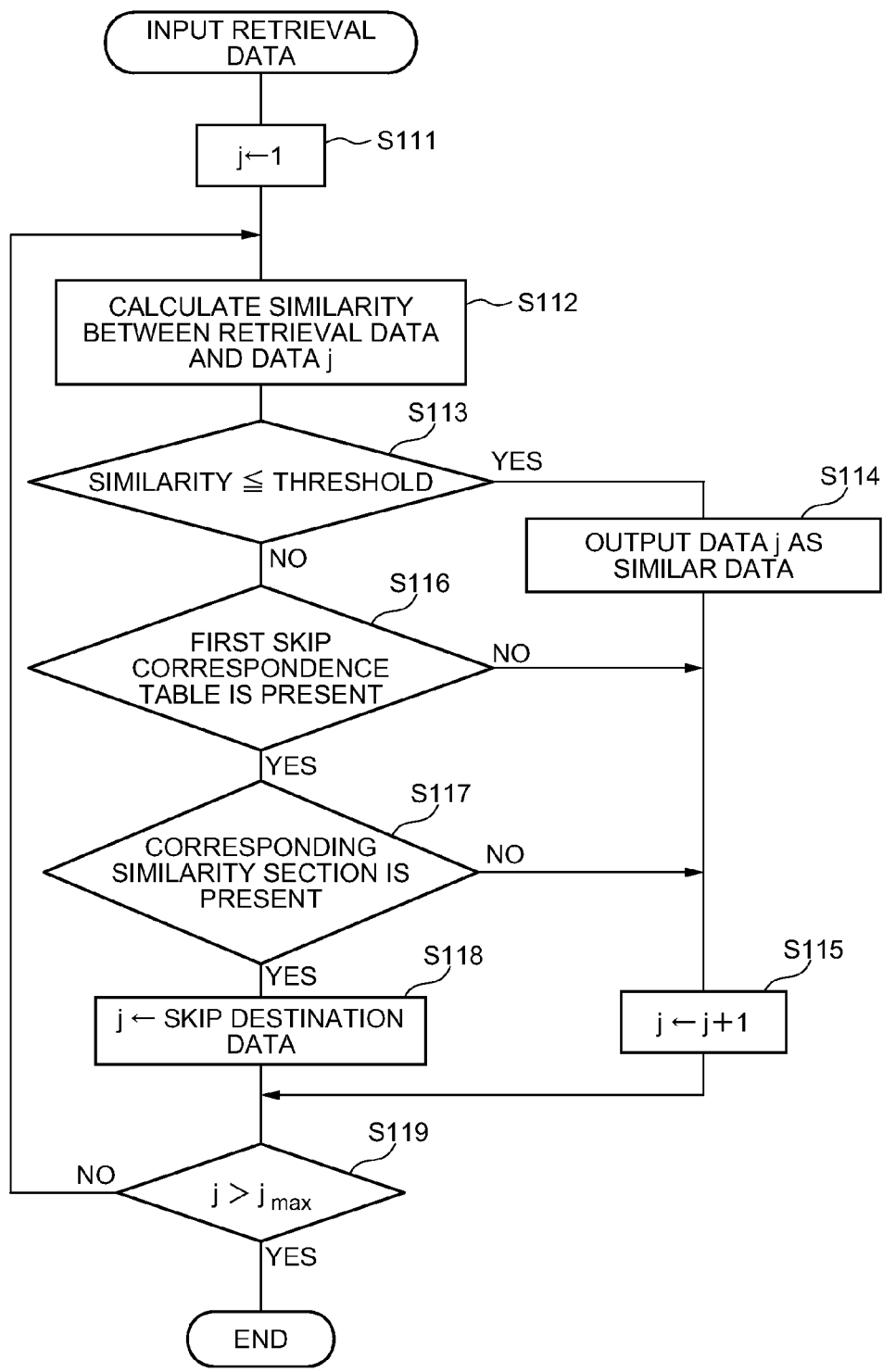
FIG. 7 is a flowchart showing an exemplary process performed by a control section according to the first embodiment of the present invention.

Upon receiving the retrieval data, the control section 120 retrieves data similar to the retrieval data from the retrieval target data series, along with the flow shown in the flowchart of FIG. 7. If there are a plurality of retrieval target data series, the same processing is performed to each retrieval target data series. Data retrieval operation according to the present embodiment will be given below for an exemplary case where one retrieval target data series is focused, and data similar to the retrieval data is retrieved from the data series.

The control section 120 initially sets 1 to a variable j for managing the order, from the head of the retrieval target data series, of data which is subject to processing (step S111), and calculates a similarity between the first data and the retrieval data by the similarity calculation section 110 (step S112).

If the similarity between the first data and the retrieval data is smaller than or equal to the threshold th (YES at step S113), the first data is output as similar data (step S114). Then, the control section 120 changes the variable j to 2 by adding 1 (step S115), returns to step S112 via step S119, sets the second data to be the data for which a similarity is calculated next, and repeats the same processing as that applied to the first data.

On the other hand, if the similarity between the first data and the retrieval data is larger than the threshold th (NO at step S113), the control section 120 checks whether or not a first skip correspondence table of the first data is stored in the storing section 150 (step S116). If the table is not stored, the control section 120 changes the variable j to 2 by adding 1 (step S115), returns to step S112 via step S119, sets the second data to be the data for which a similarity is calculated next, and repeats the same processing as that applied to the first data.

If the first skip correspondence table of the first data is stored, the control section 120 checks whether or not the first skip correspondence table includes a similarity range including the similarity between the first data and the retrieval data (step S117). If the table does not include the range, the control section 120 changes the variable j to 2 by adding 1 (step S115), returns to step S112 via step S119, sets the second data to be the next data for which a similarity is calculated, and repeats the same processing as that applied to the first data.

If the first skip correspondence table of the first data includes a similarity range including the similarity between the first data and the retrieval data, the control section 120 sets the skip destination data, which is recorded corresponding to the similarity range, as the data for which a similarity is calculated next (that is, changing the variable j so as to indicate the skip destination data) (step S118), returns to step S112 via step S119, and repeats the same processing as that applied to the first data for the skip destination data.

At step S119, the control section 120 determines whether the changed value of the variable j exceeds a maximum value $j_{max}$ of the number of data of the retrieval target data series, and if the value does not exceed the maximum value, returns to step S112, while if the value exceeds the maximum value, ends the retrieval process with respect to the retrieval target data series.

As described above, according to the present embodiment, data in which a similarity with the retrieval data is smaller than or equal to a predetermined threshold can be retrieved at a high speed from the retrieval target data series. This is because if a similarity between data in the retrieval target data series and the retrieval data is larger than the threshold, data for which similarity calculation is not necessary can be skipped by referring to the first skip correspondence table of such data.

For example, if the similarity between the data $y_j$ in the retrieval target data series and the retrieval data is 72, the skip destination data is j+7, according to the first skip correspondence table of the data $y_j$ shown in FIG. 5 or 6. As such, as similarity calculation with the retrieval data is not performed on 6 pieces of data $y_{j+1}$, $y_{j+2}$, $y_{+3}$, $y_{j+4}$, $y_{j+5}$, and $y_{j+6}$ in the retrieval target data series, the retrieval time is reduced for those data. Further, as it is not necessary to determine necessity of performing similarity calculation with the retrieval data regarding the respective data $y_{j+1}$, $y_{j+2}$, $y_{j+3}$, $y_{j+4}$, $y_{j+5}$, and $y_{j+6}$, the retrieval time can be further reduced for such calculation.

It should be noted that although the threshold th is fixed to one value in the present embodiment, the present invention is applicable to a data retrieval device in which a plurality of thresholds th are used. In that case, a first skip correspondence table is generated and stored beforehand for each of the thresholds th. For example, if there are three values of thresholds th such as 50, 60, and 70, a first skip correspondence table for th=50, a first skip correspondence table for th=60, and a first skip correspondence table for th=70 may be generated and stored.

Second Embodiment

Figure 8:
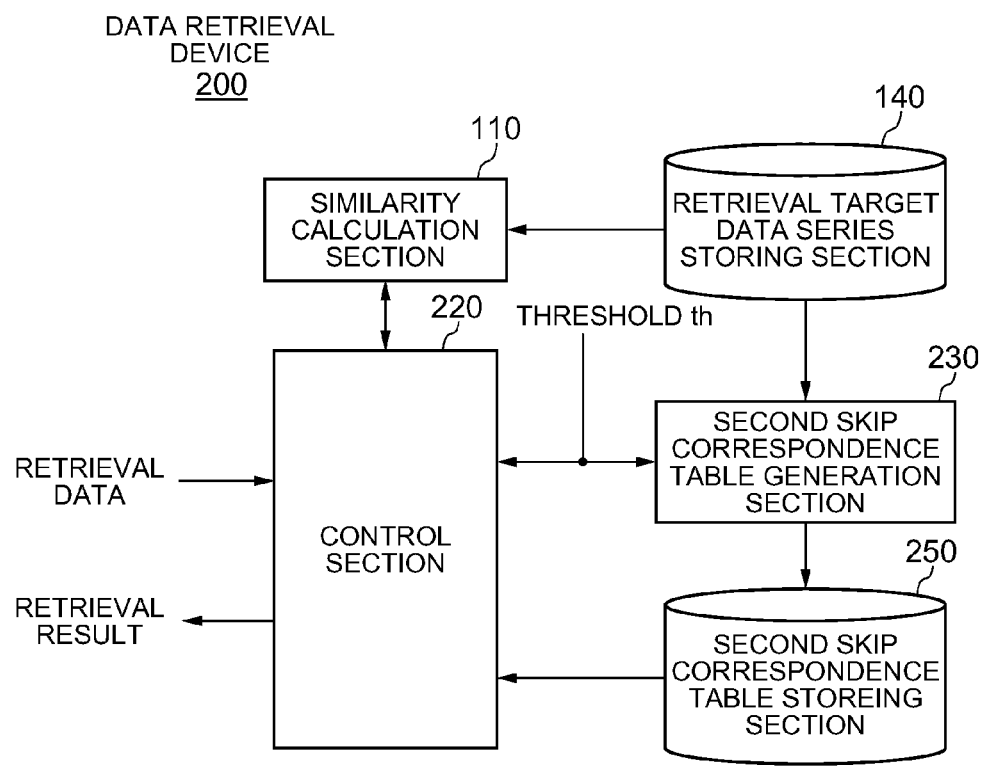
FIG. 8 is a block diagram of a second embodiment of the present invention.

Referring to FIG. 8, a data retrieval device 200 according to a second embodiment of the present invention differs from the data retrieval device 100 according to the first embodiment in that a control section 220, a second skip correspondence table generation section 230, and a second skip correspondence table storing section 250 are included, instead of the control section 120, the first skip correspondence table generation section 130, and the first skip correspondence table storing section 150.

The second skip correspondence table generation section 230 is a means for generating a second skip correspondence table of each piece of data in the retrieval target data series stored in the retrieval target data series storing section 140. It should be noted that a second skip correspondence table of a piece of data means a table containing, for each of the ranges that similarities between such data and the retrieval data may take, information for specifying the data which appears first after such data, among data in which similarities with the retrieval data may be larger than a predetermined threshold th.

The second skip correspondence table storing section 250 is a means for storing the second skip correspondence table generated by the second skip correspondence table generation section 230. The second skip correspondence table is stored in the second skip correspondence table storing section 250 in association with data in the retrieval target data series, in such a manner that the data corresponding to the table is clearly distinguishable.

The control section 220 is a means for controlling the entire data retrieval device 200. When retrieval data is input from the outside of the data retrieval device 200, the control section 220 controls the similarity calculation section 110 to calculate a similarity between the retrieval data and data in the retrieval target data series, compares the calculation result with a predetermined threshold th, to thereby determine whether or not such data is data similar to the retrieval data. If such data is similar to the retrieval data, the control section 220 outputs the data as a retrieval result, and determines data in the retrieval target data series for which a similarity with the retrieval data is calculated next, according to the similarity between such data and the retrieval data and the second skip correspondence table of such data. If the determined data is not the next data of such data, the control section 220 outputs data ranging from the next data of such data to data immediately preceding the determined data as similar data, and repeats the same processing to the determined data. In contrast, if such data is not similar to the retrieval data, the control section 120 repeats the same processing to the next data of such data.

Next, operation of the data retrieval device 200 according to the present embodiment will be described.

Operation of the data retrieval device 200 is roughly classified into second skip correspondence table generating operation which is performed prior to execution of the actual data retrieval operation, and data retrieval operation using the generated second skip correspondence table.

(1) Second Skip Correspondence Table Generating Operation

Figure 9:
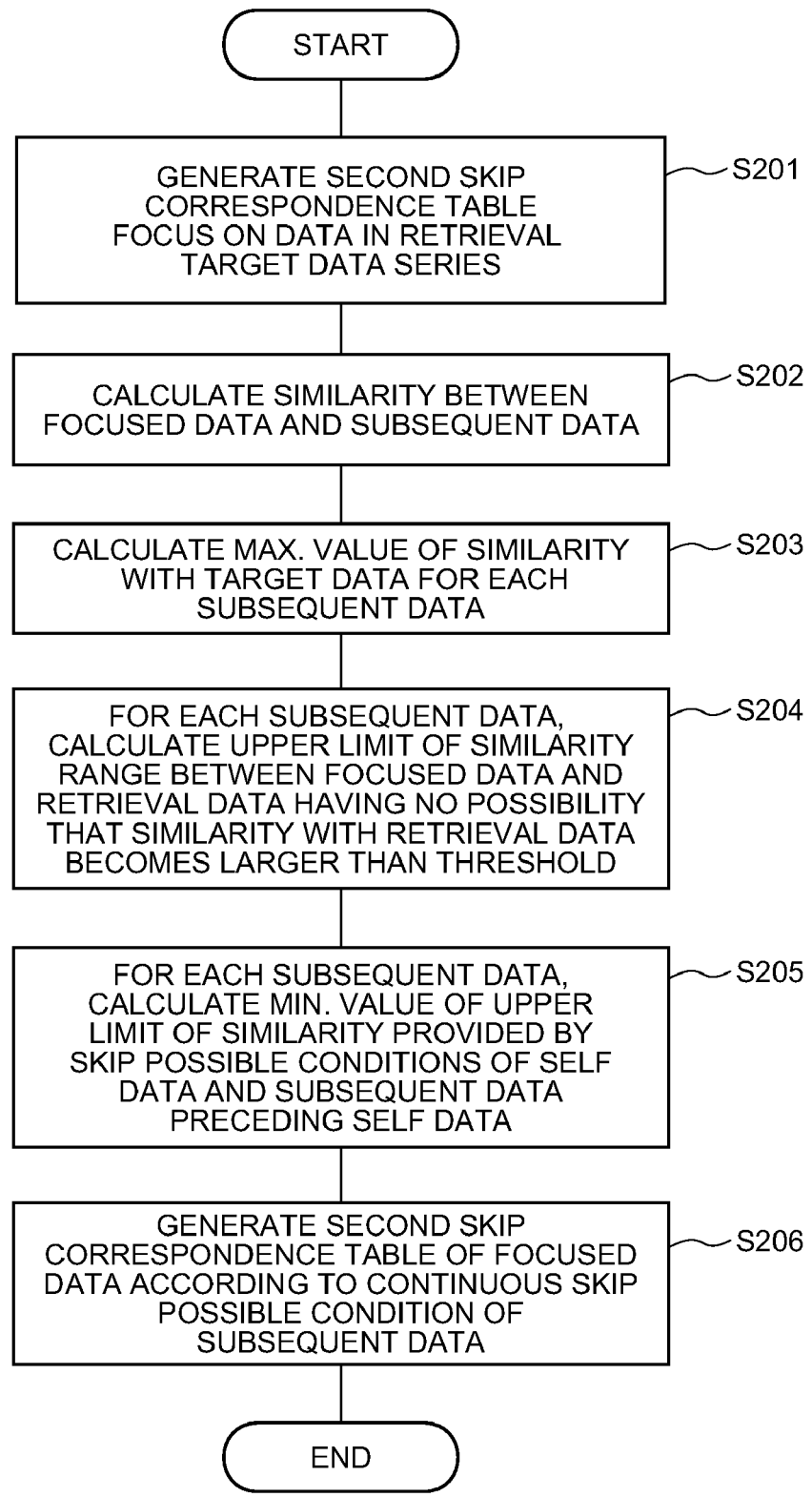
FIG. 9 is a flowchart showing an exemplary process performed by a second skip correspondence table generation section according to the second embodiment of the present invention.

The second skip correspondence generation section 230 generates, for each data in the retrieval target data series stored in the retrieval target data series storing section 140, a second skip correspondence table of the data, in line with the flow shown in the flowchart of FIG. 9.

First, the second skip correspondence table generation section 230 focuses on a piece of data in the retrieval target data series, for generating a second skip correspondence table (step S201). In this description, it is assumed that the retrieval target data series is a series of data (in this example, n-dimensional feature vectors) composed of $y_j$, $y_{j+1}$, $y_{j+2}$, $y_{j+3}$, $y_{j+4}$, $y_{j+5}$, and the like, as shown in FIG. 10(a), and that the leading data $y_h$ is focused, for the sake of convenience.

Next, the second skip correspondence generation section 230 calculates similarities $d(y_j, y_{j+1})$, $d(y_j, y_{j+2})$, ... $d(y_j, y_{j+m})$ between the focused data $y_j$ and subsequent m pieces of data $y_{j+1}$, $y_{j+2}$, ... $y_{j+m}$, and stores the calculation results in an internal table (step S202). The number m of the subsequent data for calculating similarities is arbitrary. If the number m of the subsequent data is larger, although there is a possibility of reducing a larger number of data on which similarity calculation with the retrieval data is performed, the storage capacity required for skip correspondence tables is increased. As such, the value of m is determined in advance while considering both.

FIG. 10(b) shows an exemplary internal table to be used in the process of generating the second skip correspondence table by the second skip correspondence table generation section 230. The internal table is composed of m number of entries at maximum, and each of the entries is composed of five items including subsequent data, similarity, maximum value, skip possible condition, and continuous skip possible condition. At step S202, the second skip correspondence table generation section 230 sets $y_{j+1}$, $y_{j+2}$, ... $y_{j+m}$ to the item of subsequent data, and sets similarities $d(y_j, y_{j+1})$, $d(y_j, y_{j+2})$, ... $d(y_j, y_{j+m})$ with the data $y_j$ to the item of similarity, in the respective entries of the internal table.

Next, for each of the subsequent data $y_{j+1}$, $y_{j+2}$, ... $y_{j+m}$, the second skip correspondence table generation section 230 calculates a maximum value of the similarity with the retrieval data using the similarity $D(x, y_j)$ between the retrieval data and the data $y_j$, and also the similarity between the data $y_j$ and the subsequent data, and sets the value to the item of maximum value in the internal table (step S203). For example, in the case of subsequent data $y_{j+1}$, as the similarity with the data $y_j$ is $d(y_j, y_{j+1})$ and the similarity between the data $y_j$ and the retrieval data is $D(x, y_j)$, a maximum value of the similarity between the retrieval data and the subsequent data $y_{j+1}$ is $[D(x, y_j)+d(y_j, y_{j+1})]$.

Next, for each of the subsequent data $y_{j+1}, y_{j+2}, \ldots y_{j+m}$, the second skip correspondence table generation section 230 calculates, with use of the maximum value of the similarity with the retrieval data and a threshold th provided separately, an upper limit of the similarity range between the data $y_j$ and the retrieval data having no possibility that the similarity with the retrieval data becomes larger than the threshold (having no possibility of being not similar to the retrieval data), and sets the value to the item of skip possible condition of the internal table (step S204). For example, in the case of the subsequent data $y_{j+1}$, as there is no possibility that the data is similar to the retrieval data if even the maximum value $[D(x, y_j)+d(y_j, y_{j+1})]$ is smaller than or equal to the threshold th, $[D(x, y_j) \leq \text{th}-d(y_j, y_{j+1})]$ is set to be a skip possible condition.

Next, for each of the subsequent data $y_{j+1}, y_{j+2}, \ldots y_{j+m}$, the second skip correspondence table generation section 230 calculates a minimum value of the upper limit of the similarity given by the skip possible conditions of the self data and other subsequent data preceding the self data, and sets the value to the item of continuous skip possible condition of the internal table (step S205).

Next, according to the continuous skip possible conditions of the subsequent data $y_{j+1}, y_{j+2}, \ldots y_{j+m}$, the second skip correspondence table generation section 230 generates the second skip correspondence table of the focused data $y_j$, and stores the table in the second skip correspondence table storing section 250 (step S206). Specifically, from among the upper limits of the similarities given by the continuous skip possible conditions of the subsequent data $y_{j+1}, y_{j+2}, \ldots y_{j+m}$, the second skip correspondence table generation section 230 generates a first similarity range in which an upper limit having the largest value is set to be an upper limit value and an upper limit having the second largest value is set to be a lower limit value, and as skip destination data for the case where the similarity between the focused data $y_j$ and the retrieval data satisfies the first similarity range, sets the last data among the subsequent data having the continuous skip possible conditions equivalent to the lower limit value of the first similarity range. Next, from among the upper limits of the similarities given by the continuous skip possible conditions of the subsequent data $y_{j+1}, y_{j+2}, \ldots y_{j+m}$, the second skip correspondence table generation section 230 generates a second similarity range in which an upper limit having the second largest value is set to be an upper limit value and an upper limit having the third largest value is set to be a lower limit value, and as skip destination data for the case where the similarity between the focused data $y_j$ and the retrieval data satisfies the second similarity range, sets the last data among the subsequent data having the continuous skip possible conditions equivalent to the lower limit value of the second similarity range. The second skip correspondence table generation section 130 repeats the same processing until a similarity range in which the minimum value among the upper limits of the similarities given by the continuous skip possible conditions of the subsequent data yj+1, $y_{j+2}, \ldots y_{j+m}$ is set to be a lower limit value.

FIG. 11 shows a specific example of the internal table used in the process of generating the first skip correspondence table of the data $y_j$, and FIG. 12 shows a specific example of the second skip correspondence table of the data $y_j$. In this example, the threshold th is 50, and the number m is 13.

In the internal table shown in FIG. 11, the entry of the subsequent data $y_{j+3}$, for example, indicates that the similarity with the data $y_j$ is 12, the maximum value of the similarity with the retrieval data is $[D(x, y_j)+12]$, the skip possible condition is $[D(x, y_j) \leq 38]$, and the continuous skip possible condition is $[D(x, y_j) \leq 36]$. The grounds that the continuous skip possible condition of the subsequent data $y_{j+3}$ is not the skip possible conditions of $[D(x, y_j) \leq 38]$ but $[D(x, y_j) \leq 36]$ is that the skip possible condition of the data $y_{j+2}$, preceding the self data $y_{j+3}$, is $[D(x, y_j) \leq 36]$.

Further, in FIG. 12, the first entry in the second skip correspondence table of the data $y_j$ indicates that if the similarity between the data $y_j$ and the retrieval data is larger than 36 and equal to or smaller than 40, the next data for which a similarity with the retrieval target data is calculated is data $y_{j+2}$. The first entry is data generated from the continuous skip possible conditions of the subsequent data $y_{j+1}$ and $y_{j+2}$ in the internal table shown in FIG. 11.

Further, the second entry in the first skip correspondence table of the data $y_j$ shown in FIG. 12, for example, indicates that if the similarity between the data $y_j$ and the retrieval data is larger than 33 and equal to or smaller than 36, the next data for which a similarity with the retrieval target data is calculated is data $y_{j+5}$. The second entry is data generated from the continuous skip possible conditions of the subsequent data $y_{j+2}$ to $y_{j+5}$ in the internal table shown in FIG. 11.

The second skip correspondence table generation section 230 generates second skip correspondence tables of data other than the data $y_j$ in the retrieval target data series stored in the retrieval target data series storing section 140, in accordance with the same procedure as that for the data $y_j$. However, as there is no subsequent data to the last data in the retrieval target data series, the second skip correspondence table is not generated for the last data. Further, it is also possible not to generate second skip correspondence table of all data except for the last data, but to generate second skip correspondence tables only for the predetermined partial data. Examples of partial data include even number data, odd number data, every p (>2) number data, and the like.

Further, the second skip correspondence table generation section 230 may perform a process of combining a plurality of continuous entries in the second skip correspondence table generated at step S206 in FIG. 9 into one entry to thereby reduce the number of entries in the second skip correspondence table. An entry formed by combining a plurality of continuous entries has a similarity range in which the minimum value of the lower limits of the similarity ranges of the plurality of entries before combination is the lower limit value, and the maximum value of the upper limits of the similarity ranges thereof is the upper limit value, and has skip destination data which is the leading data among the skip destination data of the plurality of entries before combination. For example, in the second skip correspondence table of FIG. 12, if the fifth and sixth entries are combined in one entry and the seventh and eighth entries are combined in one entry, a first skip correspondence table shown in FIG. 13 is generated.

As described above, by combining a plurality of entries in the second skip correspondence table to reduce the number of entries, it is possible to reduce the storage capacity required for the second skip correspondence table at the sacrifice of a maximum range for which skip is possible (skip can actually be performed a little longer).

When combining a plurality of entries in the second skip correspondence table, the following process may be taken.

If the upper limit of the storage capacity which can be allocated to the second skip correspondence table has been set, for example, it is possible to repeat reduction of the number of entries by combining the entries until the storage capacity for the second skip correspondence table becomes smaller than the upper limit.

Further, when combining a plurality of entries, it is also possible to select entries to be combined so as to reduce the similarity range to be sacrificed (skip can actually be performed a little longer) by the entry combination, for example. Specifically, if the fifth and the sixth entries shown in FIG. 12 are combined into one entry, the similarity range of the sixth entry, that is, [23<D≦25], is sacrificed (skip can actually be performed a little longer). If the seventh and the eighth entries are combined in one entry, the similarity range of the eighth entry, that is, [16<D≦20], is sacrificed (skip can actually be performed a little longer). When comparing these two cases, as the similarity range to be sacrificed is smaller in the former case, it is effective to combine the fifth and the sixth entries. In this case, the number of frames to be sacrificed or the probability to be taken by the similarity may be considered. By reducing the number of entries by combining entries in the second skip correspondence table while considering the possibility of sacrifice as described above, it is possible to maximize the efficiency of speeding up the retrieval operation provided by the second skip correspondence table with respect to the unit storage capacity of the second skip correspondence table.

(2) Data Retrieval Operation

Figure 14:
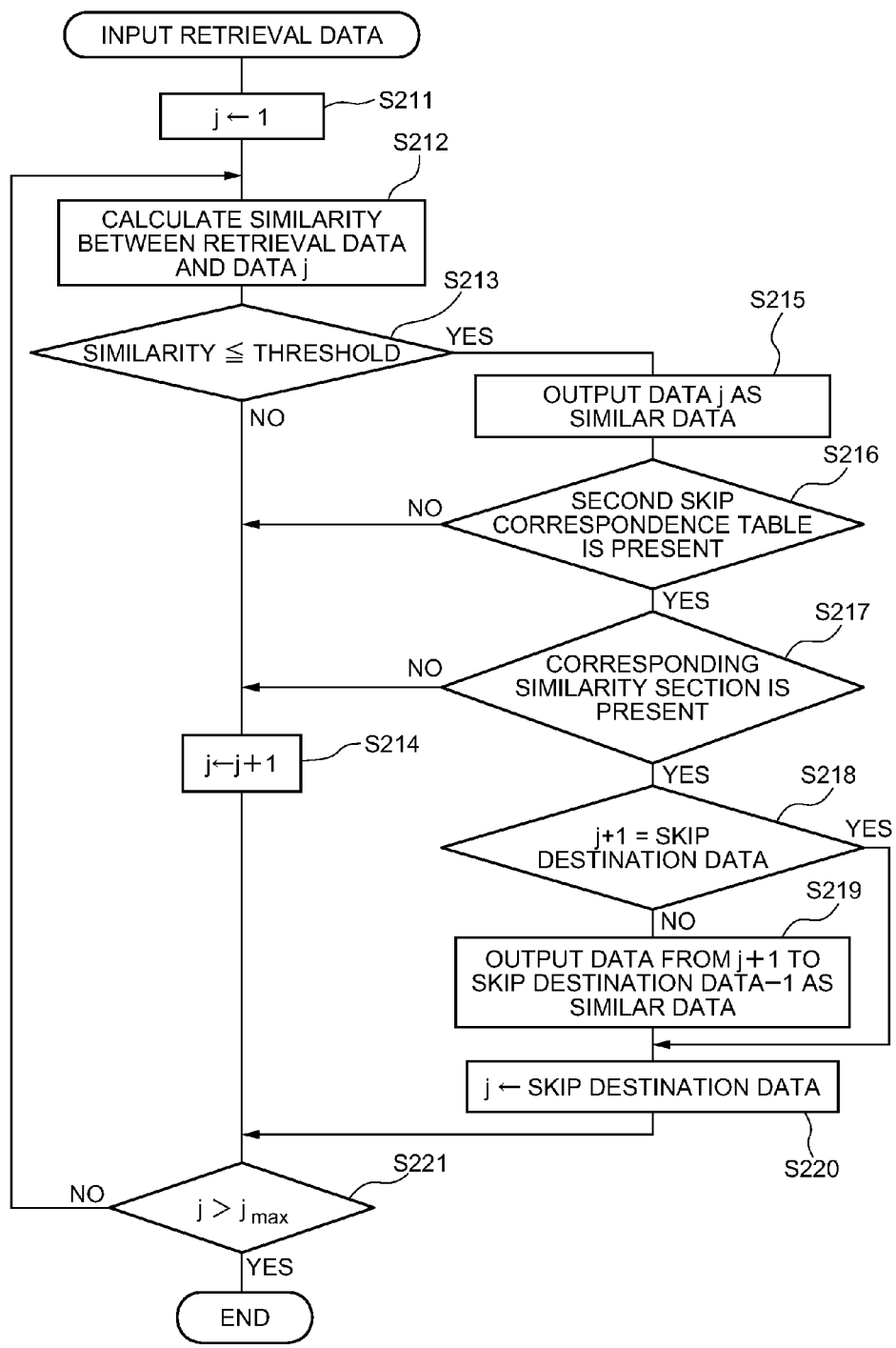
FIG. 14 is a flowchart showing an exemplary process performed by a control section according to the second embodiment of the present invention.

Upon receiving the retrieval data, the control section 220 retrieves data similar to the retrieval data from the retrieval target data series, along with the flow shown in the flowchart of FIG. 14. If there are a plurality of retrieval target data series, the same processing is performed to each retrieval target data series. Data retrieval operation according to the present embodiment will be given below for an exemplary case where one retrieval target data series is focused, and data similar to the retrieval data is retrieved from the data series.

The control section 220 initially sets 1 to a variable j for managing the order, from the head of the retrieval target data series, of data which is subject to processing (step S211), and calculates a similarity between the first data and the retrieval data by the similarity calculation section 110 (step S212).

If the similarity between the first data and the retrieval data is smaller than or equal to the threshold th (YES at step S213), the first data is output as similar data (step S215). Then, the control section 220 checks whether or not the second skip correspondence table of the first data is stored in the storing section 250 (step S216). If the table is not stored, the control section 220 changes the variable j to 2 by adding 1 (step S214), returns to step S212 via step S221, sets the second data to be data for which a similarity is calculated next, and repeats the same processing as that applied to the first data.

If the second skip correspondence table of the first data is stored, the control section 220 checks whether or not the second skip correspondence table includes a similarity range including the similarity between the first data and the retrieval data (step S217). If the table does not include the range, the control section 220 changes the variable j to 2 by adding 1 (step S214), returns to step S212 via step S221, sets the second data to be data for which a similarity is calculated next, and repeats the same processing as that applied to the first data.

If the second skip correspondence table of the first data includes a similarity range including the similarity between the first data and the retrieval data, the control section 220 determines whether or not the skip destination data, which is recorded corresponding to the similarity range, is the next data of the data currently being processed (step S218). If the skip destination data is not the next data of the data currently being processed (which means if some pieces of data are skipped), the control section 220 outputs data ranging from the next data of the data currently being processed to the data immediately preceding the skip destination data, as similar data (step S219). Then, the control section 220 sets the skip destination data to be data for which a similarity is calculated next (that is, changing the variable j so as to indicate the skip destination data) (step S220), returns to step S212 via step S221, and repeats the same processing as that applied to the first data for the skip destination data. Alternatively, if the skip destination data is the next data of the data currently being processed, the control section 220 does not perform step S219, and sets the skip destination data to be data for which a similarity is calculated next (that is, changing the variable j so as to indicate the skip destination data) (step S220), returns to step S212 via step S221, and repeats the same processing as that applied to the first data for the skip destination data.

On the other hand, if the similarity between the first data and the retrieval data is larger than the threshold th (NO at step S213), the control section 220 changes the variable j to 2 by adding 1 (step S214), returns to step S212 via step S221, sets the second data to be data for which a similarity is calculated next, and repeats the same processing as that applied to the first data.

At step S221, the control section 220 determines whether the changed value of the variable j exceeds a maximum value $j_{max}$ of the number of data of the retrieval target data series, and if the value does not exceed the maximum value, returns to step S112, while if the value exceeds the maximum value, ends the retrieval process with respect to the retrieval target data series.

As described above, according to the present embodiment, data in which a similarity with the retrieval data is smaller than or equal to a predetermined threshold can be retrieved at a high speed from the retrieval target data series. This is because if a similarity between data in the retrieval target data series and the retrieval data becomes smaller than or equal to the threshold, data for which similarity calculation is not necessary can be skipped by referring to the second skip correspondence table of such data.

For example, if the similarity between the data $y_j$ in the retrieval target data series and the retrieval data is 28, the skip destination data is j+7, according to the second skip correspondence table of the data $y_j$ shown in FIG. 12 or 13. As such, as similarity calculation with the retrieval data is not performed on 6 pieces of data $y_{j+1}$, $y_{j+2}$, $y_{j+3}$, $y_{j+4}$, $y_{j+5}$, and $y_{j+6}$ in the retrieval target data series, the retrieval time is reduced for those data. Further, as it is not necessary to determine necessity of performing similarity calculation with the retrieval data regarding the respective data $y_{j+1}$, $y_{j+2}$, $y_{j+3}$, $y_{j+4}$, yj+5, and $y_{j+6}$, the retrieval time can be further reduced for such calculation.

It should be noted that although the threshold th is fixed to one value in the present embodiment, the present invention is applicable to a data retrieval device in which a plurality of thresholds th are used. In that case, a second skip correspondence table is generated and stored beforehand for each of the thresholds th. For example, if there are three values of thresholds th such as 50, 60, and 70, a second skip correspondence table for th=50, a second skip correspondence table for th=60, and a second skip correspondence table for th=70 may be generated and stored.

Third Embodiment

Figure 15:
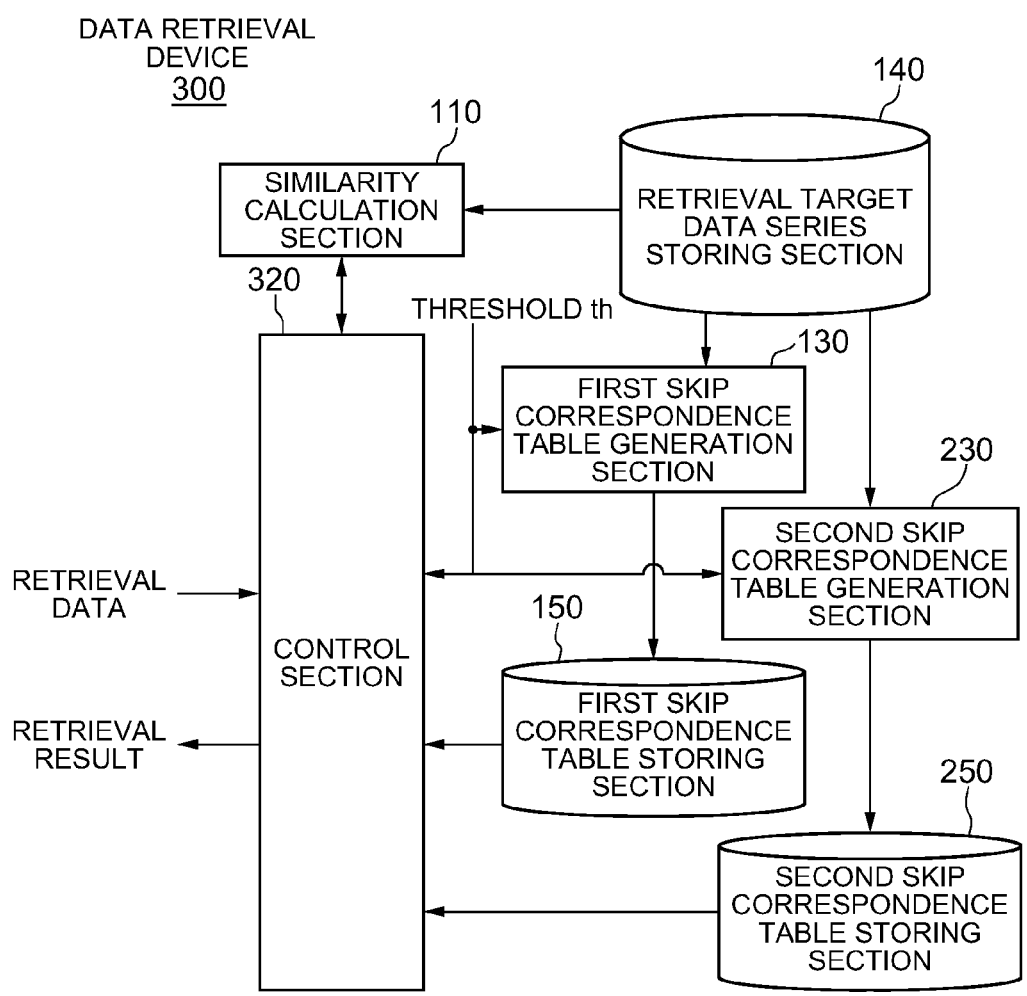
FIG. 15 is a block diagram of a third embodiment of the present invention.

Referring to FIG. 15, a data retrieval device 300 according to a third embodiment of the present invention differs from the data retrieval device 100 according to the first embodiment in that a second skip correspondence table generation section 230 and a second skip correspondence table storing section 250 are added, and also a control section 320 is included instead of the control section 120.

The second skip correspondence table generation section 230 is completely the same as the second skip correspondence table generation section 230 according to the second embodiment, which is a means for generating a second skip correspondence table of each piece of data in the retrieval target data series stored in the retrieval target data series storing section 140. Further, the second skip correspondence table storing section 250 is completely the same as the second skip correspondence table storing section 250 according to the second embodiment, which is a means for storing the second skip correspondence table generated by the second skip correspondence table generation section 230.

The control section 320 is a means for controlling the entire data retrieval device 200. When retrieval data is input from the outside of the data retrieval device 300, the control section 320 controls the similarity calculation section 110 to calculate a similarity between the retrieval data and data in the retrieval target data series, compares the calculation result with a predetermined threshold th, to thereby determine whether or not such data is data similar to the retrieval data.

If the data is not similar to the retrieval data, the control section 320 determines, according to the similarity between the data and the retrieval data and the first skip correspondence table of the data, data in the retrieval target data series for which a similarity with the retrieval data is calculated next, and repeats the same processing to the determined data.

In contrast, if the data is similar to the retrieval data, the control section 320 outputs the data as a retrieval result, and determines data in the retrieval target data series for which a similarity with the retrieval data is calculated next, according to the similarity between such data and the retrieval data and the second skip correspondence table of such data. If the determined data is not the next data of such data, the control section 320 outputs data ranging from the next data of such data to data immediately preceding the determined data as similar data, and repeats the same processing to the determined data.

Next, operation of the data retrieval device 300 according to the present embodiment will be described.

Operation of the data retrieval device 300 is roughly classified into first and second skip correspondence table generating operation which is performed prior to execution of the actual data retrieval operation, and data retrieval operation using the generated first and second skip correspondence tables.

(1) First and Second Skip Correspondence Table Generating Operation

As the operation, by the first skip correspondence table generation section 130, of generating a first skip correspondence table of each piece of data in the retrieval target data series stored in the retrieval target data series storing section 140 is the same as that performed by the first skip correspondence table generation section 130 according to the first embodiment, and the detailed operation thereof has been described above, the description is omitted.

As the operation, by the second skip correspondence table generation section 230, of generating a second skip correspondence table of each piece of data in the retrieval target data series stored in the retrieval target data series storing section 140 is the same as that performed by the second skip correspondence table generation section 230 according to the second embodiment, and the detailed operation thereof has been described above, the description is omitted.

(2) Data Retrieval Operation

Figure 16:
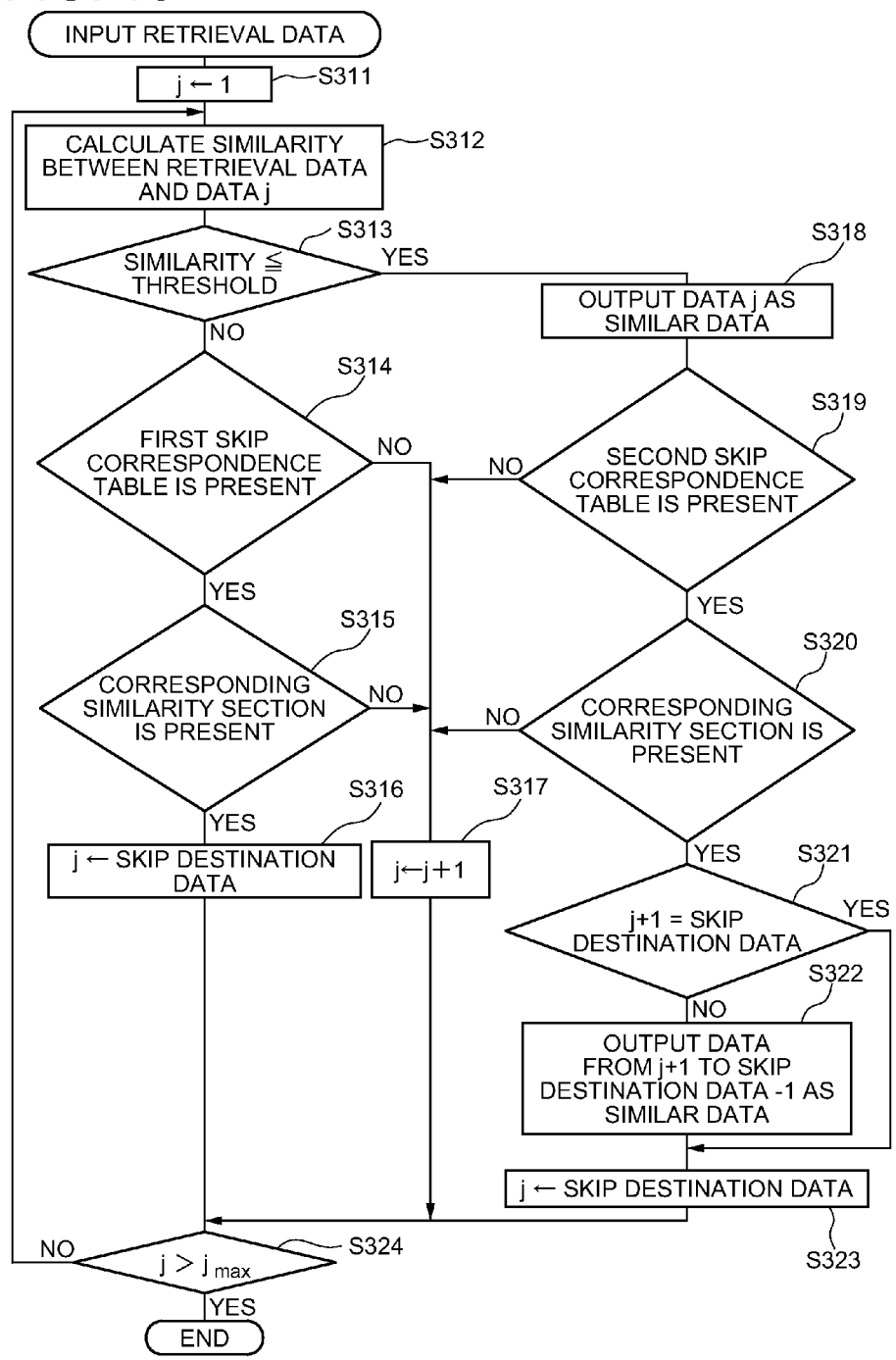
FIG. 16 is a flowchart showing an exemplary process performed by a control section according to the third embodiment of the present invention.

Upon receiving the retrieval data, the control section 320 retrieves data similar to the retrieval data from the retrieval target data series, along with the flow shown in the flowchart of FIG. 16. If there are a plurality of retrieval target data series, the same processing is performed to each retrieval target data series. Data retrieval operation according to the present embodiment will be given below for an exemplary case where one retrieval target data series is focused, and data similar to the retrieval data is retrieved from the data series.

The control section 320 initially sets 1 to a variable j for managing the order, from the head of the retrieval target data series, of data which is subject to processing (step S311), and calculates a similarity between the first data and the retrieval data by the similarity calculation section 110 (step S312).

If the similarity between the first data and the retrieval data is larger than the threshold th (NO at step S313), the control section 320 checks whether or not the first skip correspondence table of the first data is stored in the storing section 150 (step S314). If the table is not stored, the control section 320 changes the variable j to 2 by adding 1 (step S317), returns to step S312 via step S324, sets the second data to be data for which a similarity is calculated next, and repeats the same processing as that applied to the first data.

If the first skip correspondence table of the first data is stored, the control section 320 checks whether or not the first skip correspondence table includes a similarity range including the similarity between the first data and the retrieval data (step S315). If the table does not include the range, the control section 320 changes the variable j to 2 by adding 1 (step S317), returns to step S312 via step S324, sets the second data to be data for which a similarity is calculated next, and repeats the same processing as that applied to the first data.

If the first skip correspondence table of the first data includes a similarity range including the similarity between the first data and the retrieval data, the control section 320 sets the skip destination data, which is recorded corresponding to the similarity range, as data for which a similarity is calculated next (that is, changing the variable j so as to indicate the skip destination data) (step S316), returns to step S312 via step S324, and repeats the same processing as that applied to the first data for the skip destination data.

If the similarity between the first data and the retrieval data is smaller than or equal to the threshold th (YES at step S313), the first data is output as similar data (step S318). Then, the control section 320 checks whether or not the second skip correspondence table of the first data is stored in the storing section 250 (step S319). If the table is not stored, the control section 320 changes the variable j to 2 by adding 1 (step S317), returns to step S312 via step S324, sets the second data to be data for which a similarity is calculated next, and repeats the same processing as that applied to the first data.

If the second skip correspondence table of the first data is stored, the control section 320 checks whether or not the second skip correspondence table includes a similarity range including the similarity between the first data and the retrieval data (step S320). If the table does not include the range, the control section 320 changes the variable j to 2 by adding 1 (step S317), returns to step S312 via step S324, sets the second data to be data for which a similarity is calculated next, and repeats the same processing as that applied to the first data.

If the second skip correspondence table of the first data includes a similarity range including the similarity between the first data and the retrieval data, the control section 320 determines whether or not the skip destination data, which is recorded corresponding to the similarity range, is the next data of the data currently being processed (step S321). If the skip destination data is not the next data of the data currently being processed (which means if some pieces of data are skipped), the control section 320 outputs data ranging from the next data of the data currently being processed to the data immediately preceding the skip destination data, as similar data (step S322). Then, the control section 320 sets the skip destination data to be data for which a similarity is calculated next (that is, changing the variable j so as to indicate the skip destination data) (step S323), returns to step S312 via step S324, and repeats the same processing as that applied to the first data for the skip destination data. Alternatively, if the skip destination data is the next data of the data currently being processed, the control section 320 does not perform step S322, and sets the skip destination data to be data for which a similarity is calculated next (that is, changing the variable j so as to indicate the skip destination data) (step S323), returns to step S312 via step S324, and repeats the same processing as that applied to the first data for the skip destination data.

At step S324, the control section 320 determines whether the changed value of the variable j exceeds a maximum value $j_{max}$ of the number of data of the retrieval target data series, and if the value does not exceed the maximum value, returns to step S312, while if the value exceeds the maximum value, ends the retrieval process with respect to the retrieval target data series.

As described above, according to the present embodiment, data in which a similarity with the retrieval data is smaller than or equal to a predetermined threshold can be retrieved at a high speed from among the retrieval target data series.

A first reason is that when a similarity between data in the retrieval target data series and the retrieval data is larger than the threshold, data for which similarity calculation is not necessary can be skipped by referring to the first skip correspondence table of such data.

For example, if the similarity between the data $y_j$ in the retrieval target data series and the retrieval data is 72, the skip destination data is j+7, according to the first skip correspondence table of the data $y_j$ shown in FIG. 5 or 6. As such, as similarity calculation with the retrieval data is not performed on 6 pieces of data $y_{j+1}$, $y_{j+2}$, $y_{j+3}$, $y_{j+4}$, $y_{j+5}$, and $y_{j+6}$ in the retrieval target data series, the retrieval time is reduced for those data. Further, as it is not necessary to determine necessity of performing similarity calculation with the retrieval data regarding the respective data $y_{j+1}$, $y_{j+2}$, $y_{j+3}$, $y_{j+4}$, $y_{j+5}$, and $y_{j+6}$, the retrieval time can be further reduced for such calculation.

A second reason is that when a similarity between data in the retrieval target data series and the retrieval data is smaller than or equal to the threshold, data for which similarity calculation is not necessary can be skipped by referring to the second skip correspondence table of such data.

For example, if the similarity between the data $y_j$ in the retrieval target data series and the retrieval data is 28, the skip destination data is j+7, according to the second skip correspondence table of the data $y_j$ shown in FIG. 12 or 13. As such, as similarity calculation with the retrieval data is not performed on 6 pieces of data $y_{j+1}$, $y_{j+2}$, $y_{j+3}$, $y_{j+4}$, $y_{j+5}$, and $y_{j+6}$ in the retrieval target data series, the retrieval time is reduced for those data. Further, as it is not necessary to determine necessity of performing similarity calculation with the retrieval data regarding the respective data $y_{j+1}$, $y_{j+2}$, $y_{j+3}$, $y_{j+5}$, and $y_{j+6}$, the retrieval time can be further reduced for such calculation.

It should be noted that although the threshold th is fixed to one value in the present embodiment, the present invention is applicable to a data retrieval device in which a plurality of thresholds are used. In that case, first and second skip correspondence tables are generated and stored beforehand for each of the thresholds th. For example, if there are three values of thresholds th such as 50, 60, and 70, first and second skip correspondence tables for th=50, first and second skip correspondence tables for th=60, and first and second skip correspondence tables for th=70 may be generated and stored.

While the embodiments of the present invention have been described above, the present invention is not limited to these examples. It will be understood by those of ordinary skill in the art that various changes in form and details may be made therein without departing from the scope of the present invention. Further, the data retrieval device of the present invention is adapted such that the functions thereof can be realized by computers and programs, as well as hardware. Such a program is provided in the form of being written on a computer readable recording medium such as a magnetic disk, a semiconductor memory, or the like, is read by a computer when the computer is started for example, and controls operation of the computer, to thereby allow the computer to function as the similarity calculation section, the control section, the first skip correspondence table generation section, the second skip correspondence table generation section, and the like of the above-described embodiments.

This application is based upon and claims the benefit of priority from Japanese patent application No. 2009-12811, filed on Jan. 23, 2009, the disclosure of which is incorporated herein in its entirety by reference.

REFERENCE NUMERALS 100, 200, 300 data retrieval device
110 similarity calculation section
120, 220, 320 control section
130 first skip correspondence table generation section
140 retrieval target data series storing section
150 first skip correspondence table storing section
230 second skip correspondence table generation section

The invention claimed is:

1. A data retrieval device realized by a computer, the computer comprising:
  a memory that stores a first skip correspondence table that corresponds to each piece of data in a retrieval target data series, and, for each possible similarity range which is taken by a similarity between corresponding data and retrieval data, records skip destination data information for specifying the data which appears first after the corresponding data among pieces of data in which similarities with the retrieval data have the possibility to have a predetermined relationship in comparison with a predetermined threshold; and
  a control unit which in response to an input of retrieval data and when a similarity with the retrieval data is smaller than or equal to the threshold from among the retrieval target data series, calculates a similarity between a certain data from among the retrieval target data series and the retrieval data, selects data in the retrieval target data series which is calculated following the certain data, based on the similarity and the first skip correspondence table corresponding to the certain data, and outputs the selected data,
  wherein when a similarity range including the similarity between the piece of data and the retrieved data is present in the first skip correspondence table, the control unit determines data indicated by skip destination data information, which is recorded corresponding to the similarity range present in the first skip correspondence table, to be data in the retrieval target data series for which a similarity with the retrieval data is calculated next.

2. The data retrieval device, according to claim 1, wherein the predetermined relationship is a relationship in which a similarity with the retrieval data is smaller than or equal to the threshold.

3. The data retrieval device, according to claim 2, wherein when a similarity with the retrieval data calculated for a piece of data in the retrieval target data series is not smaller than or equal to the threshold, the control unit determines data in the retrieval target data series for which a similarity with the retrieval data is calculated next, according to the calculated similarity and the first skip correspondence table of the piece of data.

4. The data retrieval device, according to claim 2, further comprising
a first skip correspondence table generation unit that receives the retrieval target data series and generates the first skip correspondence table of each data in the retrieval target data series.

5. The data retrieval device, according to claim 4, wherein the first skip correspondence table generation unit calculates a similarity between subsequent data of generation target data of the first skip correspondence table and the generation target data, obtains, from the similarity and the threshold, a skip possible condition indicating a lower limit of a similarity between the generation target data and the retrieval data having no possibility that a similarity between the subsequent data and the retrieval data becomes smaller than or equal to the threshold, calculates a continuous skip possible condition indicating a maximum value of the lower limit of the similarity provided by the skip possible conditions of the self data and subsequent data preceding the self data, and according to the continuous skip possible condition calculated, generates a first skip correspondence table of the generation target data.

6. The data retrieval device, according to claim 1, wherein the predetermined relationship is a relationship in which a similarity with the retrieval data is larger than the threshold.

7. The data retrieval device, according to claim 6, wherein when a similarity with the retrieval data calculated for a piece of data in the retrieval target data series is smaller than or equal to the threshold, the control unit determines data in the retrieval target data series for which a similarity with the target data is calculated next, according to the calculated similarity and the first skip correspondence table of the piece of data.

8. The data retrieval device, according to claim 7, further comprising
a first skip correspondence table generation unit that receives the retrieval target data series and generates the first skip correspondence table of each data in the retrieval target data series.

9. The data retrieval device, according to claim 8, wherein the first skip correspondence table generation unit calculates a similarity between subsequent data of generation target data of the first skip correspondence table and the generation target data, obtains, from the similarity and the threshold, a skip possible condition indicating an upper limit of a similarity between the generation target data and the retrieval data having no possibility that a similarity between the subsequent data and the retrieval data becomes larger than the threshold, calculates a continuous skip possible condition indicating a minimum value of the upper, limit of the similarity provided by the skip possible conditions of the self data and subsequent data preceding the self data, and according to the continuous skip possible condition calculated, generates a first skip correspondence table of the generation target data.

10. The data retrieval device, according to claim 5, wherein the first skip correspondence table generation unit combines a plurality of continuous similarity ranges in the generated first skip correspondence table into one similarity range, and assigns most preceding data of a plurality of skip destination data corresponding to the similarity ranges before combination, as skip destination data corresponding to the combined similarity range.

11. The data retrieval device, according to claim 1, wherein the first skip correspondence table generation unit generates the first skip correspondence table only for partial data of the retrieval target data series.

12. The data retrieval device, according to claim 2, further comprising
a second skip correspondence table that corresponds to each piece of data in a retrieval target data series, and, for each possible similarity range which is taken by a similarity between corresponding data and retrieval data, records skip destination data information for specifying the data which appears first after the corresponding data among pieces of data in which similarities with the retrieval data have the possibility not to have the predetermined relationship with the threshold, wherein
the control unit selects data in the retrieval target data series for which calculation of a similarity with the retrieval data is necessary, using the first skip correspondence table and the second skip correspondence table.

13. The data retrieval device, according to claim 12, wherein
when a similarity with the retrieval data calculated for a piece of data in the retrieval target data series is not smaller than or equal to the threshold, the control unit determines data in the retrieval target data series for which a similarity with the retrieval data is calculated next, according to the calculated similarity and the first skip correspondence table of the piece of data, and
when a similarity with the retrieval data calculated for a piece of data in the retrieval target data series is smaller than or equal to the threshold, the control unit determines data in the retrieval target data series for which a similarity with the target data is calculated next, according to the calculated similarity and the second skip correspondence table of the piece of data.

14. The data retrieval device, according to claim 13, wherein
when a similarity range including the similarity between the piece of data and the retrieval data is present in the first skip correspondence table, the control unit determines data indicated by skip destination data information, which is recorded corresponding to the similarity range present in the first skip correspondence table, to be data in the retrieval target data series for which a similarity with the retrieval data is calculated next, and
when the similarity range including the similarity between the piece of data and the retrieval data is present in the second skip correspondence table, the control unit determines data indicated by skip destination data information, which is recorded corresponding to the similarity range present in the first skip correspondence table, to be data in the retrieval target data series for which a similarity with the retrieval data is calculated next.

15. The data retrieval device, according to claim 12, further comprising:

a first skip correspondence table generation unit that receives the retrieval target data series and generates the first skip correspondence table of each data in the retrieval target data series, and a second skip correspondence table generation unit that receives the retrieval target data series and generates the second skip correspondence table of each data in the retrieval target data series.

16. The data retrieval device, according to claim 15, wherein the first skip correspondence table generation unit calculates a similarity between subsequent data of generation target data of the first skip correspondence table and the generation target data, obtains, from the similarity and the threshold, a skip possible condition indicating a lower limit of a similarity between the generation target data and the retrieval data having no possibility that a similarity between the subsequent data and the retrieval data becomes smaller than or equal to the threshold, calculates a continuous skip possible condition indicating a maximum value of the lower limit of the similarity provided by the skip possible conditions of the self data and subsequent data preceding the self data, and according to the continuous skip possible condition calculated, generates a first skip correspondence table of the generation target data, and the second skip correspondence table generation unit calculates a similarity between subsequent data of generation target data of the second skip correspondence table and the generation target data, obtains, from the similarity and the threshold, a skip possible condition indicating an upper limit of a similarity between the generation target data and the retrieval data having no possibility that a similarity between the subsequent data and the retrieval data becomes larger than the threshold, calculates a continuous skip possible condition indicating a minimum value of the upper limit of the similarity provided by the skip possible conditions of the self data and subsequent data preceding the self data, and according to the continuous skip possible condition calculated, generates a second skip correspondence table of the generation target data.

17. The data retrieval device, according to claim 16, wherein the first skip correspondence table generation unit combines a plurality of continuous similarity ranges in the generated first skip correspondence table into one similarity range, and assigns most preceding data of a plurality of skip destination data corresponding to the similarity ranges before combination, as skip destination data corresponding to the combined similarity range, and the second skip correspondence table generation unit combines a plurality of continuous similarity ranges in the generated second skip correspondence table into one similarity range, and assigns most preceding data of a plurality of skip destination data corresponding to the similarity ranges before combination, as skip destination data corresponding to the combined similarity range.

18. The data retrieval device, according to claim 15, wherein the first skip correspondence table generation unit generates the first skip correspondence table only for partial data of the retrieval target data series, and the second skip correspondence table generation unit generates the second skip correspondence table only for partial data of the retrieval target data series.

19. The data retrieval device, according to claim 1, wherein the data is a feature vector, and the similarity is a distance between feature vectors.

20. A data retrieval method for controlling a computer, the method comprising:

storing a first skip correspondence table that corresponds to each piece of data in a retrieval target data series, and, for each possible similarity range which is taken by a similarity between corresponding data and retrieval data, records skip destination data information for specifying the data which appears first after the corresponding data among pieces of data in which similarities with the retrieval data have the possibility to have a predetermined relationship in comparison with a predetermined threshold; and in response to an input of retrieval data and when a similarity with the retrieval data is smaller than or equal to the threshold from among the retrieval target data series, calculates a similarity between a certain data from among the retrieval target data series and the retrieval data, selects data in the retrieval target data series which is calculated following the certain data, based on the similarity and the first skip correspondence table corresponding to the certain data, and outputs the selected data, wherein the selecting includes, when a similarity range including the similarity between the piece of data and the retrieved data is present in the first skip correspondence table, the control unit determines data indicated by skip destination data information, which is recorded corresponding to the similarity range present in the first skip correspondence table, to be data in the retrieval target data series for which a similarity with the retrieval data is calculated next.

21. The data retrieving method, according to claim 20, wherein the predetermined relationship is a relationship in which a similarity with the retrieval data is smaller than or equal to the threshold.

22. The data retrieving method, according to claim 21, wherein the selecting includes, when a similarity with the retrieval data calculated for a piece of data in the retrieval target data series is not smaller than or equal to the threshold, determining data in the retrieval target data series for which a similarity with the retrieval data is calculated next, according to the calculated similarity and the first skip correspondence table of the piece of data.

23. The data retrieving method, according to claim 21, further comprising receiving the retrieval target data series and generating the first skip correspondence table of each data in the retrieval target data series.

24. The data retrieving method, according to claim 23, wherein the generating the first skip correspondence table includes calculating a similarity between subsequent data of generation target data of the first skip correspondence table and the generation target data, obtaining, from the similarity and the threshold, a skip possible condition indicating a lower limit of a similarity between the generation target data and the retrieval data having no possibility that a similarity between the subsequent data and the retrieval data becomes smaller than or equal to the threshold, calculating a continuous skip possible condition indicating a maximum value of the lower limit of the similarity provided by the skip possible conditions of the self data and subsequent data preceding the self data, and according to the continuous skip possible condition calculated, generating a first skip correspondence table of the generation target data.

25. The data retrieving method, according to claim 20, wherein
the predetermined relationship is a relationship in which a similarity with the retrieval data is larger than the threshold.

26. The data retrieving method, according to claim 25, wherein
the selecting includes, when a similarity with the retrieval data calculated for a piece of data in the retrieval target data series is smaller than or equal to the threshold, determining data in the retrieval target data series for which a similarity with the target data is calculated next, according to the calculated similarity and the first skip correspondence table of the piece of data.

27. The data retrieving method, according to claim 25, further comprising
receiving the retrieval target data series and generating the first skip correspondence table of each data in the retrieval target data series.

28. The data retrieving method, according to claim 27, wherein
the generating the first skip correspondence table includes calculating a similarity between subsequent data of generation target data of the first skip correspondence table and the generation target data, obtaining, from the similarity and the threshold, a skip possible condition indicating an upper limit of a similarity between the generation target data and the retrieval data having no possibility that a similarity between the subsequent data and the retrieval data becomes larger than the threshold, calculating a continuous skip possible condition indicating a minimum value of the upper limit of the similarity provided by the skip possible conditions of the self data and subsequent data preceding the self data, and according to the continuous skip possible condition calculated, generating a first skip correspondence table of the generation target data.

29. The data retrieving method, according to claim 24, wherein
the generating the first skip correspondence table includes combining a plurality of continuous similarity ranges in the generated first skip correspondence table into one similarity range, and assigning most preceding data of a plurality of skip destination data corresponding to the similarity ranges before combination, as skip destination data corresponding to the combined similarity range.

30. The data retrieving method, according to claim 20, wherein
in the generating the first skip correspondence table, the first skip correspondence table is generated only for partial data of the retrieval target data series.

31. The data retrieving method, according to claim 22, further comprising
the selecting includes, in addition to the first skip correspondence table, using a second skip correspondence table that corresponds to each piece of data in the retrieval target data series, and, for each possible similarity range which is taken by a similarity between corresponding data and retrieval data, records skip destination data information for specifying the data which appears first after the corresponding data among pieces of data in which similarities with the retrieval data have the possibility not to have the predetermined relationship with the threshold, selecting data in the retrieval target data series for which calculation of a similarity with the retrieval data is necessary.

32. The data retrieving method, according to claim 31, wherein
the selecting includes,
when a similarity with the retrieval data calculated for a piece of data in the retrieval target data series is not smaller than or equal to the threshold, determining data in the retrieval target data series for which a similarity with the retrieval data is calculated next, according to the calculated similarity and the first skip correspondence table of the piece of data, and
when a similarity with the retrieval data calculated for a piece of data in the retrieval target data series is smaller than or equal to the threshold, determining data in the retrieval target data series for which a similarity with the target data is calculated next, according to the calculated similarity and the second skip correspondence table of the piece of data.

33. The data retrieving method, according to claim 32, wherein
the selecting includes,
when a similarity range including the similarity between the piece of data and the retrieval data is present in the first skip correspondence table, determining data indicated by skip destination data information, which is recorded corresponding to the similarity range present in the first skip correspondence table, to be data in the retrieval target data series for which a similarity with the retrieval data is calculated next, and
when the similarity range including the similarity between the piece of data and the retrieval data is present in the second skip correspondence table, determining data indicated by skip destination data information, which is recorded corresponding to the similarity range present in the first skip correspondence table, to be data in the retrieval target data series for which a similarity with the retrieval data is calculated next.

34. The data retrieving method, according to claim 31, further comprising:
receiving the retrieval target data series and generating the first skip correspondence table of each data in the retrieval target data series, and
receiving the retrieval target data series and generating the second skip correspondence table of each data in the retrieval target data series.

35. The data retrieving method, according to claim 34, wherein
the generating the first skip correspondence table includes calculating a similarity between subsequent data of generation target data of the first skip correspondence table and the generation target data, obtaining, from the similarity and the threshold, a skip possible condition indicating a lower limit of a similarity between the generation target data and the retrieval data having no possibility that a similarity between the subsequent data and the retrieval data becomes smaller than or equal to the threshold, calculating a continuous skip possible condition indicating a maximum value of the lower limit of the similarity provided by the skip possible conditions of the self data and subsequent data preceding the self data, and according to the continuous skip possible condition calculated, generating a first skip correspondence table of the generation target data, and the generating the second skip correspondence table includes calculating a similarity between subsequent data of generation target data of the second skip correspondence table and the generation target data, obtaining, from the similarity and the threshold, a skip possible condition indicating an upper limit of a similarity between the generation target data and the retrieval data having no possibility that a similarity between the subsequent data and the retrieval data becomes larger than the threshold, calculating a continuous skip possible condition indicating a minimum value of the upper limit of the similarity provided by the skip possible conditions of the self data and subsequent data preceding the self data, and according to the continuous skip possible condition calculated, generating a second skip correspondence table of the generation target data.

36. The data retrieving method, according to claim 35, wherein the generating the first skip correspondence table includes combining a plurality of continuous similarity ranges in the generated first skip correspondence table into one similarity range, and assigning most preceding data of a plurality of skip destination data corresponding to the similarity ranges before combination, as skip destination data corresponding to the combined similarity range, and the generating the second skip correspondence table includes combining a plurality of continuous similarity ranges in the generated second skip correspondence table into one similarity range, and assigning most preceding data of a plurality of skip destination data corresponding to the similarity ranges before combination, as skip destination data corresponding to the combined similarity range.

37. The data retrieving method, according to claim 34, wherein in the generating the first skip correspondence table, the first skip correspondence table is generated only for partial data of the retrieval target data series, and in the generating the second skip correspondence table, the second skip correspondence table is generated only for partial data of the retrieval target data series.

38. The data retrieving method, according to claim 20, wherein the data is a feature vector, and the similarity is a distance between feature vectors.

39. A non-transitory computer-readable medium having instructions to cause a computer to execute a method for controlling the computer, the method comprising:

storing a first skip correspondence table that corresponds to each piece of data in a retrieval target data series, and, for each possible similarity range which is taken by a similarity between corresponding data and retrieval data, records skip destination data information for specifying the data which appears first after the corresponding data among pieces of data in which similarities with the retrieval data have the possibility to have a predetermined relationship in comparison with a predetermined threshold; and in response to an input of retrieval data and when a similarity with the retrieval data is smaller than or equal to the threshold from among the retrieval target data series, calculates a similarity between a certain data from among the retrieval target data series and the retrieval data, selects data in the retrieval target data series which is calculated following the certain data, based on the similarity and the first skip correspondence table corresponding to the certain data, and outputs the selected data, wherein the selecting includes, when a similarity range including the similarity between the piece of data and the retrieved data is present in the first skip correspondence table, the control unit determines data indicated by skip destination data information, which is recorded corresponding to the similarity range present in the first skip correspondence table, to be data in the retrieval target data series for which a similarity with the retrieval data is calculated next.

* * * * *

UNITED STATES PATENT AND TRADEMARK OFFICE
CERTIFICATE OF CORRECTION

| | |
|---|---|
| PATENT NO. | : 8,244,739 B2 |
| APPLICATION NO. | : 12/995144 |
| DATED | : August 14, 2012 |
| INVENTOR(S) | : Kota Iwamoto and Ryoma Oami |

It is certified that error appears in the above-identified patent and that said Letters Patent is hereby corrected as shown below:

In the Specification

Column 9, Line 9: Delete "$y_{+3}$," and insert -- $y_{j+3}$, --

Column 10, Line 31: Delete "$y_h$" and insert -- $y_j$ --

Column 10, Line 53: Delete "$d(y_j, y_{j+1}$," and insert -- $d(y_j, y_{j+1})$, --

Column 14, Line 45: Delete "$y_{y+1}$," and insert -- $y_{j+1}$, --

Column 17, Line 59: Before "$y_{j+5}$," insert -- $y_{j+4}$, --

Column 18, Line 35: Below "generation section" insert -- 250 second skip correspondence table storing section --

In the Claims

Column 19, Line 48: In Claim 8, delete "claim 7," and insert -- claim 6, --

Column 19, Line 65: In Claim 9, delete "upper," and insert -- upper --

Column 23, Line 60: In Claim 31, delete "claim 22," and insert -- claim 21, --

Signed and Sealed this
Twenty-first Day of October, 2014

Michelle K. Lee
*Deputy Director of the United States Patent and Trademark Office*